(12) United States Patent
Goodspeed et al.

(10) Patent No.: US 8,745,218 B1
(45) Date of Patent: Jun. 3, 2014

(54) PREDICTIVE GOVERNING OF DYNAMIC MODIFICATION OF PROGRAM EXECUTION CAPACITY

(71) Applicant: Amazon Technologies, Inc., Reno, NV (US)

(72) Inventors: Joshua M. Goodspeed, Seattle, WA (US); Zhuo Zhang, Seattle, WA (US); Swaminathan Subramanian, Sunnyvale, CA (US); Muhammad Ali Siddiqui, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/711,451

(22) Filed: Dec. 11, 2012

Related U.S. Application Data

(63) Continuation of application No. 12/950,630, filed on Nov. 19, 2010, now Pat. No. 8,346,921.

(51) Int. Cl.
*G06F 15/173* (2006.01)
(52) U.S. Cl.
USPC ............ 709/224; 709/200; 709/203; 709/223
(58) Field of Classification Search
USPC ......... 709/203, 223, 224, 200, 218, 220, 246; 718/102; 714/47.1
See application file for complete search history.

(56) References Cited

U.S. PATENT DOCUMENTS

| | | | |
|---|---|---|---|
| 5,408,587 A | 4/1995 | Maier et al. ...................... 395/51 |
| 7,792,944 B2 | 9/2010 | DeSantis et al. .............. 709/223 |
| 7,937,438 B1 | 5/2011 | Miller et al. ................... 709/203 |
| 8,190,682 B2 | 5/2012 | Paterson-Jones et al. ..... 709/205 |
| 8,346,921 B1 * | 1/2013 | Goodspeed et al. ........... 709/224 |
| 2002/0002613 A1 * | 1/2002 | Freeman et al. ............... 709/225 |
| 2004/0205108 A1 | 10/2004 | Tanaka ........................... 709/201 |
| 2006/0173857 A1 | 8/2006 | Jackson .......................... 707/10 |
| 2006/0179143 A1 | 8/2006 | Walker et al. ................. 709/226 |
| 2007/0240160 A1 | 10/2007 | Paterson-Jones et al. ..... 718/104 |
| 2008/0059557 A1 | 3/2008 | DeSantis et al. .............. 709/201 |
| 2008/0080374 A1 * | 4/2008 | Nuzman et al. ............... 370/230 |

(Continued)

OTHER PUBLICATIONS

Metz, C. "Amazon Teaches Cloud Self-Growth Trick," May 18, 2009, retrieved on Aug. 11, 2009, from http://www.theregister.co.uk/2009/05/18/amazon_cloud_monitoring_and_fluffing_tools/print.html, 3 pages.

(Continued)

*Primary Examiner* — El Hadji Sall
(74) *Attorney, Agent, or Firm* — Seed IP Law Group PLLC

(57) ABSTRACT

Techniques are described for managing program execution capacity or other capacity of computing-related hardware resources used to execute software programs, such as for a group of computing nodes that is in use executing one or more programs for a user. Dynamic modifications to the program execution capacity of the group may include adding or removing computing nodes, such as in response to automated determinations that previously specified triggers are currently satisfied, and may be automatically governed at particular times based on automatically generated predictions of program execution capacity that will be used at those times by the group, such as to verify that requested dynamic execution capacity modifications at a time are within the predicted execution capacity values for that time. In some situations, the techniques are used in conjunction with a fee-based program execution service that executes multiple programs on behalf of multiple users of the service.

24 Claims, 10 Drawing Sheets

(56) References Cited

U.S. PATENT DOCUMENTS

| | | | | |
|---|---|---|---|---|
| 2009/0012641 | A1 | 1/2009 | Ruggieri | 700/100 |
| 2009/0157737 | A1 | 6/2009 | Konik et al. | 707/103 R |
| 2010/0005259 | A1* | 1/2010 | Prahlad et al. | 711/162 |
| 2011/0078411 | A1 | 3/2011 | Maclinovsky et al. | 712/30 |
| 2011/0078705 | A1* | 3/2011 | Maclinovsky et al. | 719/318 |
| 2011/0173637 | A1* | 7/2011 | Brandwine et al. | 719/314 |
| 2012/0072762 | A1* | 3/2012 | Atchison et al. | 714/2 |

OTHER PUBLICATIONS

Willis, John M., "Tools to Use in the Cloud (Revised)," Feb. 4, 2009, retrieved on Aug. 11, 2009, from http://www.johnmwillis.com/other/tools-to-use-in-the-cloud/, 8 pages.

Work, H., "Scalr: The Auto-Scaling Open-Source Amazon EC2 Effort," Apr. 3, 2008, retrieved on Aug. 11, 2009, from http://www.techcrunch.com/2008/04/03/scalr-the-auto-scaling-open-source-amazon-ec2-effort/, 1 page.

Amazon Web Services, "Amazon Elastic Compute Cloud (Amazon EC2)," retrieved on Aug. 11, 2009, from http://aws.amazon.com/ec2/, 7 pages.

Amazon Web Services, "Announcement: Introducing Monitoring, Auto Scaling and Elastic Load Balancing for Amazon EC2," May 17, 2009, retrieved on Jul. 6, 2009, from http://developer.amazonwebservices.com/connect/ann.jspa?annID=446, 1 page.

Amazon Web Services, "Auto Scaling," retrieved on Aug. 11, 2009, from http://aws.amazon.com/autoscaling, 2 pages.

O'Reilly Conferences, "Pool Party: Autoscaling on EC2," May 30, 2008, retrieved on Aug. 11, 2009, from http://en.oreilly.com/rails2008/public/schedule/detail/4528, 4 pages.

Rackspace Cloud, "Cloud Sites and Cloud Computing FAQ from Rackspace Cloud Hosting," retrieved on Aug. 11, 2009, from http://www.rackspacecloud.com/cloud_hosting_products/sites/faq, 9 pages.

Rackspace Cloud, "Cloud Sites—The Power of Cloud Computing & Cloud Hosting by Rackspace," retrieved on Aug. 11, 2009, from http://www.rackspacecloud.com/cloud_hosting_products/sites, 4 pages.

Right Scale, "Scalable Website," retrieved on Aug. 11, 2009, from http://www.rightscale.com/products/cloud-computing-uses/scalable-website.php?clickTag=Scalab . . . , 6 pages.

Wikipedia, "Tivoli Software," retrieved Aug. 11, 2009, from http://en.wikipedia.org/wiki/Tivoli_Software, 2 pages.

WeoCEO, retrieved Aug. 11, 2009, from http://weoceo.weogeo.com/, 1 page.

3tera, "Cloud Computing Without Compromise," retrieved Aug. 11, 2009, from http://www.3tera.com/Cloud-computing/faq.php, 2 pages.

3tera, "Cloudware Open Architecture for Cloud Computing," retrieved Aug. 11, 2009, from http://www.3tera.com/Cloud-computing/, 2 pages.

Amazon Web Services, "Auto Scaling," retrieved on Jul. 21, 2010, from http://aws.amazon.com/autoscaling, 2 pages.

Amazon Web Services Blog, "New Features for Amazon EC2: Elastic Load Balancing, Auto Scaling, and Amazon CloudWatch," retrieved on Jul. 21, 2010, from http://aws.typepad.com/aws/2009/05/new-aws-load-balancing-automatic-scaling-and-clo . . . , 3 pages.

* cited by examiner

EXAMPLE TRIGGERS

Trigger TR-1 – if aggregate CPU utilization >= 80%, then increase computing node quantity by 4
Trigger TR-2 – if aggregate CPU utilization >= 90%, then increase computing node quantity by 6
Trigger TR-3 – if aggregate CPU utilization < 20%, then decrease computing node quantity by 2

...

Trigger TR-N – if aggregate bandwidth utilization >= 75%, then increase computing node quantity by 2

Example Computing Node Group Events Database

| | Event ID | Group ID | Event Type | Event Source | Time | Time Period |
|---|---|---|---|---|---|---|
| 295a | E01 | Group1 | group initialization | user instruction | T03 | first |
| 295b | E02 | Group1 | initiate node replacement | system initiated | T04 | first |
| 295c | E03 | Group1 | initiate node replacement | system initiated | T07 | first |
| 295d | E04 | Group1 | increase desired quantity by 3 | user instruction | T15 | second |
| 295e | E05 | Group1 | increase desired quantity by 4 | trigger TR-1 | T16 | second |
| 295f | E06 | Group1 | increase desired quantity by 2 | trigger TR-N | T18 | second |
| 295g | E07 | Group1 | decrease desired quantity by 2 | trigger TR-3 | T27 | third |
| | ... | | | | | |

*Fig. 2B*

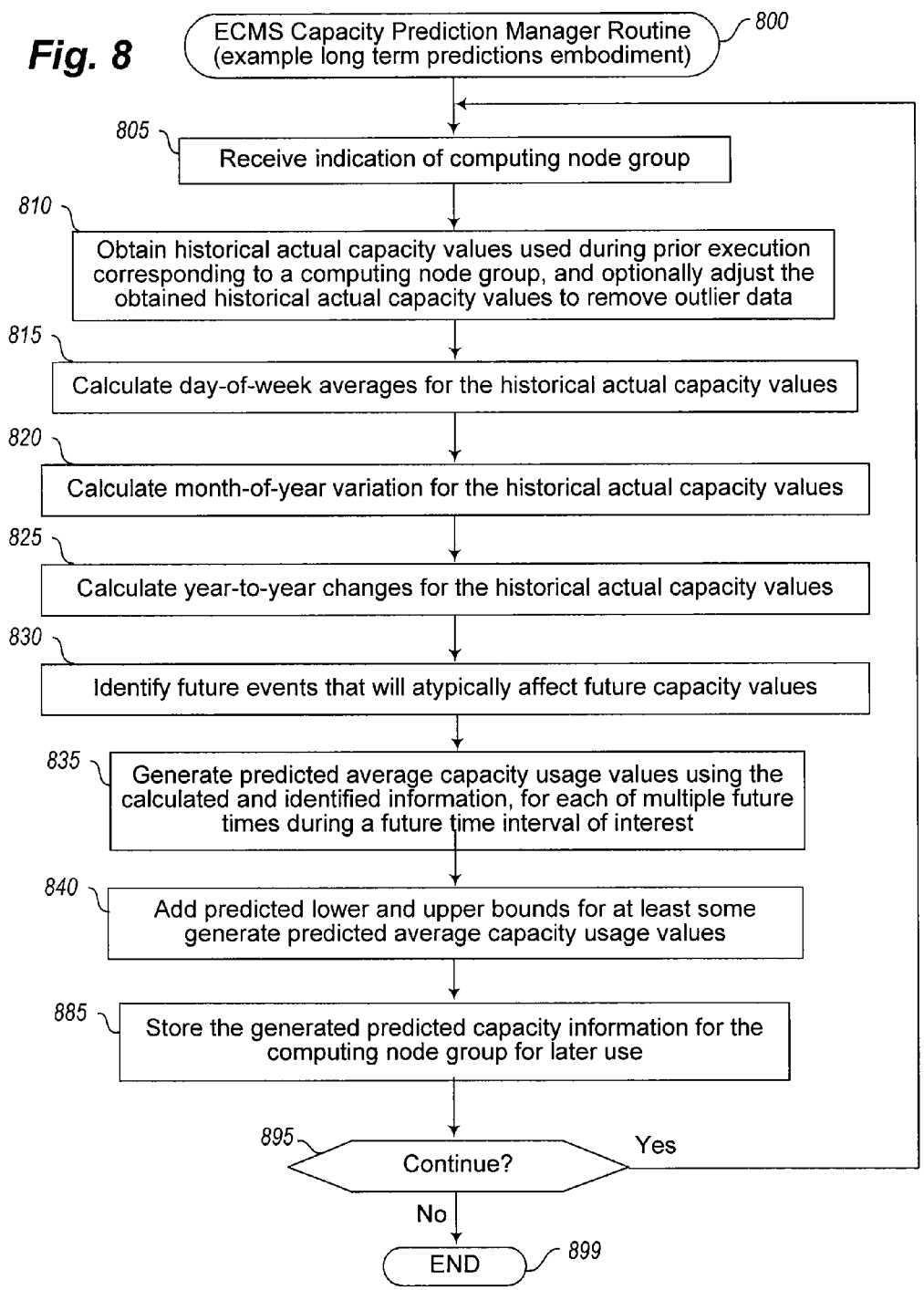

PREDICTIVE GOVERNING OF DYNAMIC MODIFICATION OF PROGRAM EXECUTION CAPACITY

BACKGROUND

Many companies and other organizations operate computer networks that interconnect numerous computing systems to support their operations, such as with the computing systems being alternatively co-located (e.g., as part of a private local area network, or "LAN") or instead located in multiple distinct geographical locations (e.g., connected via one or more other private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many users with diverse needs, allowing various computing resources to be efficiently and securely shared by multiple users. For example, virtualization technologies such as those provided by VMWare, XEN, Linux's KVM ("Kernel-based Virtual Machine"), or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

BRIEF DESCRIPTION OF THE DRAWINGS

FIGS. 2A and 2B illustrate examples of managing program execution capacity of a group of multiple computing nodes for a user, such as to automatically govern the dynamic modification of available program execution capacity at various times and in various manners.

FIG. 8 illustrates a flow diagram of an example embodiment of an ECMS Capacity Prediction Manager routine.

DETAILED DESCRIPTION

Figure 1A:
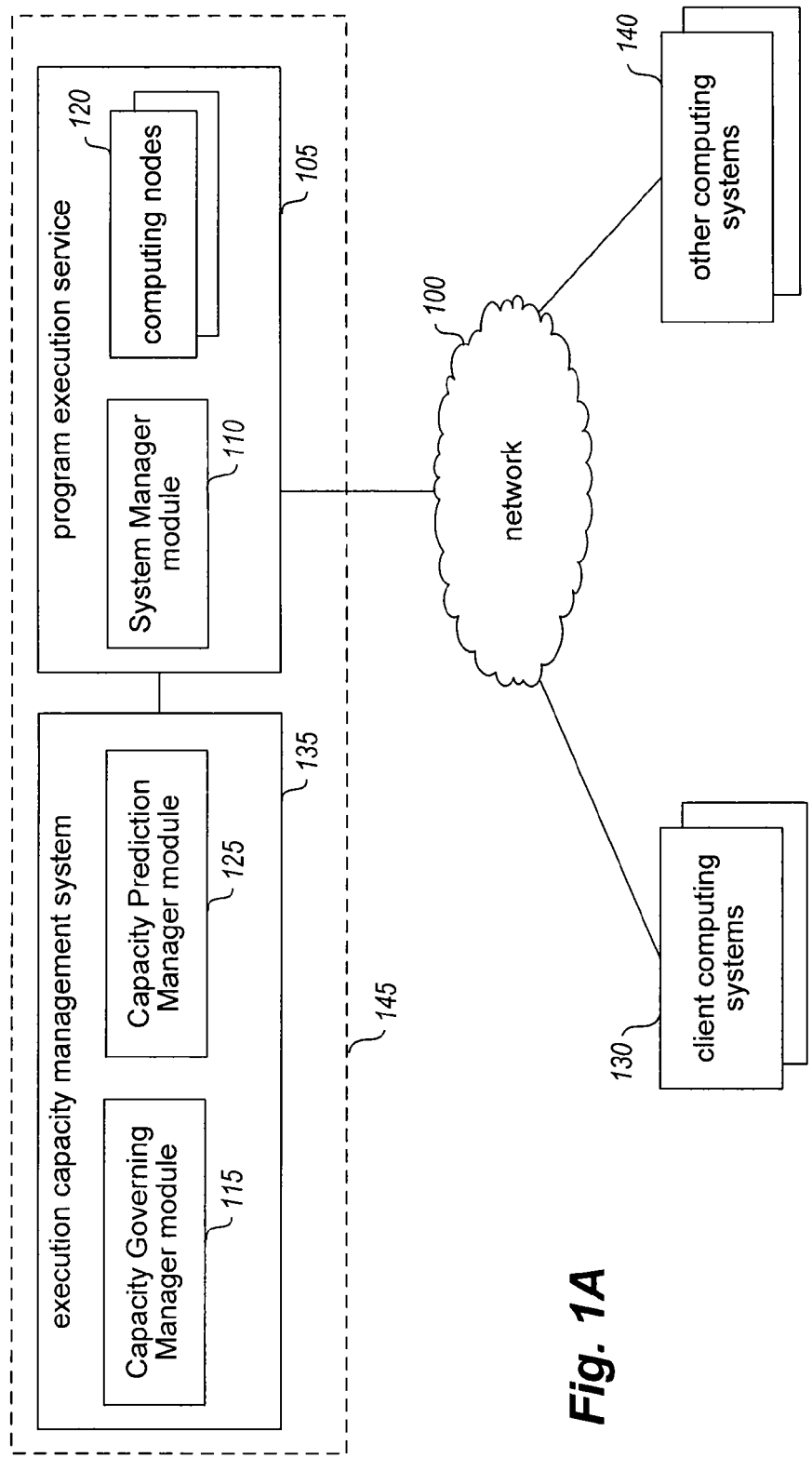
FIGS. 1A and 1B are network diagrams illustrating example embodiments of interactions to manage program execution capacity available to multiple users of a program execution service.

Techniques are described for managing execution-related capacity used by one or more clients, such as program execution capacity used to execute software programs for one or more users or other capacity of computing-related hardware resources used by one or more users. In at least some embodiments, the execution-related capacity being managed includes a group of one or more computing nodes that are provided for use in executing one or more software programs, with the group of computing nodes being dynamically modifiable while in use in order to manage an amount of execution-related capacity that is available to the user from the computing nodes of the group. The modifications to the group of computing nodes associated with a user may have various forms in various embodiments (e.g., to modify a quantity of computing nodes in the group, such as by dynamically adding and/or removing computing nodes), and may be initiated in various manners in various embodiments. In addition, in at least some embodiments, the dynamic modification of the execution-related capacity is automatically governed by an embodiment of an automated execution capacity management system, such as an execution capacity management system that is part of or otherwise operates in conjunction with a program execution service ("PES") that manages the execution of multiple programs on behalf of multiple customers or other users of the service. In particular, in at least some embodiments, the execution capacity management system generates predictions of execution-related capacity that will be used at each of multiple future times by a group of computing nodes for execution of one or more software programs, and then later at one or more of those future times uses the predicted execution-related capacity for that time to govern the dynamic modification of the capacity that is available at that time and/or to provide other benefits related to the use of the execution-related capacity. Additional details are included below related to the dynamic modification of execution-related capacity available from a group of computing nodes and to the automatic governing of such dynamic modification.

In some embodiments discussed below, the execution-related capacity being managed includes program execution capacity used to execute software programs for one or more users. However, it will be appreciated that the described techniques may in at least some embodiments be used to manage resource usage capacity that includes access to various types of computing-related resources or other hardware resources, including in some situations for purposes other than execution of one or more software programs. A non-exclusive list of examples of types of hardware resources that may be managed for use by multiple users in accordance with the described techniques include the following: persistent data storage capabilities (e.g., on non-volatile memory devices, such as hard disk drives); temporary data storage capabilities (e.g., on volatile memory, such as RAM); message queuing and/or passing capabilities; other types of communication capabilities (e.g., network sockets, virtual communication circuits, etc.); database management capabilities; dedicated bandwidth or other network-related resources; input device capabilities; output device capabilities; CPU cycles or other instruction execution capabilities; multiple devices that provide a common type of functionality; multiple devices from a common manufacturer or other source; multiple devices that are grouped together by the execution capacity management system (e.g., in a common pool); etc.

When managing program execution capacity used to execute one or more software programs for a user, the dynamic modifications that are performed to a group of computing nodes that is in use executing the one or more programs may have various forms and may be initiated in various manners in various embodiments. As one example, the program execution capacity of the group of computing nodes may be measured at least in part by the quantity of computing nodes that are part of the group, and may be modified by changing the computing node quantity of the group (e.g., to increase the program execution capacity by increasing the computing node quantity, and to decrease the program execution capacity by decreasing the computing node quantity). In addition, a PES or other system that is managing the computing nodes of a group that is in use executing one or more programs for a user may automatically determine to make dynamic program execution capacity modifications for the computing node group in various manners. For example, in at least some embodiments and situations, the user may dynamically supply specified modification instructions, while in other embodiments and situations, requests to make dynamic program execution capacity modifications for the computing node group may be based at least in part on one or more of automated determinations that triggers previously defined by the user are currently satisfied, of automated operations of a service that is providing the computing nodes of the group, etc. Similar techniques apply to managing hardware resources in other situations, and additional details are included below related to the dynamic modification of program execution capacity available from a group of computing nodes.

As previously noted, in at least some embodiments, the dynamic modification of program execution capacity or other resource usage capacity being provided to a user may be automatically governed by an embodiment of an execution capacity management system ("ECMS"). In particular, in at least some embodiments, the execution capacity management system generates predictions of capacity that will be used at each of multiple future times by a group of computing nodes (e.g., for execution of one or more software programs), and then later at one or more of those future times uses the predicted capacity information for that time to govern the dynamic modification of the capacity being provided at that time and/or to provide other benefits related to the use of the capacity.

The prediction of future program execution capacity usage or other resource usage capacity may be performed in various manners in various embodiments, and in at least some embodiments includes generating a range of predicted future capacity usage amounts for each of one or more times, such as with a mean or midpoint or other average value for each such range, as well as upper and lower bounds for each such range. In some embodiments, the predictions of future capacity usage may include long-term predictions, such as for future times that are days, weeks, months, years, etc. into the future, and in some embodiments the predictions of future capacity usage may include short-term predictions, such as for future times that are minutes, hours, etc. into the future. For example, in some embodiments and situations, information is obtained about historical execution of a particular program by a particular user, such as the amount of program execution capacity or other resource capacity that was historically used at one or more prior times, and that historical information is assessed and adjusted to create predictions of future capacity that will be used at one or more future times. In addition, in some embodiments and situations, information is obtained about recent activity that has occurred, and that recent activity information is assessed and adjusted to create predictions of future program execution capacity or other resource capacity that will be used at one or more future times—when predicting such future capacity to be used for a particular software program and particular user, such recent activity information may, for example, reflect ongoing execution of that particular program for that particular user (e.g., performance characteristics related to that ongoing execution), or instead may have other forms (e.g., based on recent or ongoing execution of that particular program for a related user, recent or ongoing execution of a related program for that particular user, etc.).

Short-term predictions of future program execution capacity may be made in various manners in various embodiments, and in some embodiments may include obtaining information about recent program execution capacity or other recent activity information related to executing one or more software programs of interest, and generating predicted future program execution capacity information for one or more future time intervals (or future time points) that are based in part on that recent activity, such as based on performing regression and/or extrapolation (e.g., based on exponential smoothing). For example, a forecasting model may be used to generate three values for each future time interval of interest (e.g., every five minutes from the current time into the future for a specified length of time, such as for the next 24 hours; every hour from the current time into the future for a specified length of time, such as for the next 24 hours, etc.) for a particular group of computing nodes to execute one or more software programs for one or more users, with the first value being a predicted execution capacity amount, and the remaining two numbers being upper and lower bound values above and below the first value (e.g., by using statistical modeling of a margin for error, such as a standard deviation, a probabilistic assessment of a specified degree of likelihood, etc.). The predicted range of values for each such time interval may also optionally be updated as additional information becomes available about recent activity (e.g., may be updated after each time interval based on information about the ongoing execution by the particular group of computing nodes during the most recent time interval, may be updated every six hours, etc.). A non-exclusive list of types of forecasting models that may be used to generate such short-term predictions include the following: exponential smoothing of historical time-series data or other historical data, such as using the standard Holt-Winters algorithm, a double seasonal Holt-Winters algorithm, etc.; using an autoregressive moving average ("ARMA") or Box-Jenkins model; using an autoregressive integrated moving average ("ARIMA") model; using other regression and/or extrapolation models; etc. It will be appreciated that similar techniques may be used for short-term predictions of other types of future resource usage capacity (e.g., use of hardware resources of one or more types) in other embodiments.

Long-term predictions of future program execution capacity may be made in various manners in various embodiments, and in some embodiments may include obtaining historical program execution capacity information that has time-series data over multiple time intervals of interest (e.g., multiple days, multiple hours, etc.), and the predicted future program execution capacity information may similarly include predicted time-series data over a future period of time (e.g., a future period of days, weeks, months, years, etc.) that includes multiple of those time intervals (or that includes multiple time intervals of a different size, such as to aggregate multiple historical time intervals into each longer future time interval, to disaggregate each historical time interval into multiple shorter future time intervals, etc.). The long-term prediction of future program execution capacity may in some embodiments include performing one or more of the following non-exclusive activities: calculating a day-of-week average of program execution capacity that was used from historical data; calculating an average month-of-year variation of program execution capacity that was used from the historical data; estimating a year-to-year change in program execution capacity, optionally based on multiple years of historical data; identifying predictable future events that will affect program execution capacity in atypical manners not reflect in day-of-week, month-of-year and year-to-year variations, such as a holiday season that is not captured in average monthly variations, a particular planned item/feature release or advertising campaign or other activity that will affect program execution capacity, etc.; generating predicted average program execution capacity amounts for particular future time intervals based on information from some or all of the prior activities; adding upper and lower bounds for some or all predicted program execution capacity amounts for particular future time intervals, such as to reflect generated uncertainty for and/or confidence intervals for particular predicted program execution capacity amounts; etc. It will be appreciated that similar techniques may be used for long-term predictions of other types of future resource usage capacity (e.g., use of hardware resources of one or more types) in other embodiments. Additional details related to such long-term predictions are included below.

In other embodiments, the prediction of future program execution capacity may be performed in other manners, including one or more of the following non-exclusive list: for only a single future time; for only a single predicted program execution capacity amount for a particular future time; without using and/or generating time-series data; for only short-term predictions; for only long-term predictions; in a manner that is not specific to any particular software programs (e.g., for a particular user, based on that user's prior use of program execution capacity for one or more programs); in a manner that is not specific to any particular user (e.g., for a particular software program, based on prior program execution capacity used for that software program by one or more users); in a manner that is not specific to any particular software programs or any particular users (e.g., based on a quantity of computing nodes or other measure of program execution capacity that is used at one or more times); etc. Additional details related to generating predicted future program execution capacity are included below.

After information is obtained by the execution capacity management system that indicates predictions of program execution capacity amounts at one or more future times for a group of computing nodes executing one or more software programs (e.g., after that prediction information is dynamically generated by the execution capacity management system, or is otherwise received by the execution capacity management system), the execution capacity management system uses the predicted program execution capacity information in at least some embodiments to govern the dynamic modification of the program execution capacity at one or more future times. In particular, the execution capacity management system treats the predicted program execution capacity information for a group of computing nodes at a particular future time in at least some embodiments as being pre-authorized or otherwise indicating allowable execution capacity for that group of computing nodes at that future time, such that a request to dynamically modify the program execution capacity for that group of computing nodes at that future time will be automatically authorized by the execution capacity management system if the requested amount of program execution capacity is within a range of predicted program execution capacity values for that future time or is otherwise one of one or more predicted program execution capacity values for that future time. Conversely, in some embodiments, the automatic authorization by the execution capacity management system of a requested amount of program execution capacity for a dynamic modification to a group of computing nodes for a user may be based only in part on such predicted program execution capacity information, such as if the automatic authorization also includes determining that one or more other specified criteria are satisfied. Such other criteria may be specified by, for example, the user, the program execution service, the execution capacity management system, etc., and may have various forms (e.g., criteria related to a threshold percentage or absolute change in the program execution capacity, to a threshold percentage or absolute change or absolute amount in fees charged by a program execution service to the user to provide requested program execution capacity, to a current amount owed or other balance of the user with respect to the program execution service and/or execution capacity management system, etc.).

Alternatively, if the execution capacity management system determines that a request to dynamically modify the program execution capacity for a group of computing nodes for a user at a future time is not one of one or more predicted program execution capacity values for that future time, the execution capacity management system may take other actions. For example, in some embodiments and situations, the execution capacity management system may deny such a request for dynamic modification, while in other embodiments and situations, the execution capacity management system may identify and perform an alternative dynamic modification that provides an altered amount of program execution capacity that is different from the current amount and from the requested amount. As one example, if the requested amount of program execution capacity for a dynamic modification at a particular time is above a highest predicted program execution capacity amount for that time (e.g., above an upper bound of a range for that time, or otherwise above a highest of one or more predicted amounts), the altered amount of program execution capacity that is automatically identified may be that highest predicted program execution capacity amount. Similarly, if the requested amount of program execution capacity for a dynamic modification at a particular time is below a lowest predicted program execution capacity amount for that time (e.g., below a lower bound of a range for that time, or otherwise below a lowest of one or more predicted amounts), the altered amount of program execution capacity that is automatically identified may be that lowest predicted program execution capacity amount. In yet other embodiments, the execution capacity management system may take further actions if a requested amount of program execution capacity for a group of computing nodes for a user at a future time is determined to not be one of one or more predicted program execution capacity values for that future time, such as one or more of the following non-exclusive list: notifying the user of the requested amount of program execution capacity and/or of the determination; prompting the user to provide manual approval of the requested amount of program execution capacity, and proceeding to provide the requested amount if such approval is obtained; prompting the user to provide manual approval of an automatically identified altered amount of program execution capacity, and proceeding to provide that altered amount if such approval is obtained; deferring the requested amount of program execution capacity until a later time at which the requested amount is within a range of predicted execution capacity values for that later time; etc.

In addition, in some embodiments, the execution capacity management system may use predicted program execution capacity information for a group of computing nodes for a user to provide other benefits, whether in addition to or instead of using the predicted program execution capacity information to automatically govern dynamic modifications of the program execution capacity for the group. For example, in some embodiments, the predicted program execution capacity information for a group of computing nodes for a user may be used to automatically govern the program execution capacity of the group by automatically initiating changes for the group in advance of any user-specified or automatically determined requests, such as if the execution capacity management system initiates acquisition and/or provisioning of additional computing nodes to be added to the group based on an expected or possible future request to use those additional computing nodes in the group—such advance provisioning may include, for example, determining that a predicted program execution capacity value for a current or a future time (e.g., an average or otherwise expected predicted value for the time) is above the current program execution capacity for the group (e.g., by at least a specified threshold), and initiating the provisioning immediately (e.g., if the predicted program execution capacity value is for the current time) or at a selected time in the future (e.g., if the predicted program execution capacity value is for a future time, at a time this is sufficiently prior to that future time to allow the computing nodes being provisioned to be available at that future time, such as based on an amount of time that the provisioning lasts).

As previously noted, in some embodiments the execution capacity management system may be part of or otherwise operate in conjunction with a program execution service, such that the automatic governing by the execution capacity management system for a group of computing nodes being managed by the program execution service for a user is automatically performed by the execution capacity management system and program execution service without concurrent review and/or approval by the user. In other embodiments, the execution capacity management system may be used in other manners, such as if a particular user executes a copy of the execution capacity management system, and the automatic governing by the execution capacity management system for a group of computing nodes includes various other actions taken by the execution capacity management system (e.g., if the group of computing nodes is being provided by a separate program execution service, taking actions that include sending corresponding instructions from the execution capacity management system to the program execution service). In yet other embodiments, the execution capacity management system may be operated by an entity that is a third-party to one or more program execution services and to one or more users that are customers of the execution capacity management system (e.g., for a fee), such that the execution capacity management system performs some or all of the described techniques (e.g., the generating of predicted program execution capacity information and/or the automatic governing of program execution capacity of a group of computing nodes based on predicted program execution capacity information) on behalf of those one or more users and/or those one or more program execution services. Furthermore, a user who interacts with the program execution service and/or the execution capacity management system may have various forms in various embodiments, such as an individual human person, an executing software program, a group or business or other entity that may optionally have one or more human representatives, etc.

The described techniques for automatically governing dynamic program execution capacity modifications based on predicted information may provide various benefits in various situations. For example, the techniques allow a user to pre-define various types of capacity modification triggers that make requests for dynamic program execution capacity modifications for a group of computing nodes based on various factors (e.g., based on performance characteristics of the group of computing nodes), but with the changes to the program execution capacity being automatically limited to amounts that have been predicted to be reasonable or likely or otherwise allowable for a particular time, such as to automatically prevent automated changes that are significantly outside of typical or otherwise expected values. Such automated triggers may have various uses (e.g., to reactively increase the program execution capacity of a group of computing nodes to accommodate a temporary increase in the computing load for the computing node group; to proactively increase or decrease the program execution capacity of a group of computing nodes to accommodate an expected upcoming need for additional program execution capacity and/or an expected upcoming lack of need for existing program execution capacity, such as based on trends over time in particular performance characteristics and/or historical data indicating recurring patterns of program execution capacity use; etc.). Alternatively, a user may desire to maintain the program execution capacity for a group of computing nodes at or near a specified level (e.g., a specified desired constant quantity of computing nodes), and various modifications may be automatically made to the group of computing nodes to maintain the available program execution capacity at that specified level (e.g., to return an actual computing node quantity that has deviated from the specified desired quantity back to that specified desired quantity). Such techniques may be of use, for example, when each of the computing nodes of the group executes a distinct copy of the same program (e.g., to serve as alternatives for an aggregate computing load over the group), and the quantity of computing nodes are modified to manage the amount of work handled by each computing node, or otherwise in situations in which the various computing nodes of a group do not each execute a distinct copy of the same program (e.g., if distinct subsets of the group computing nodes each execute copies of different programs, such as to have some computing nodes execute an application server program and to have other computing nodes execute an associated database server program; if some or all of the computing nodes perform different parts of a single program, such as in a distributed manner; etc.). Furthermore, when adding additional computing nodes to a group, the PES or other system may further optionally take other actions in at least some situations, such as to provision the added computing node to be ready to execute one or more programs, or to further automatically initiate the execution of the one or more programs on the added computing node.

As previously noted, the dynamic modifications that are performed to a group of computing nodes that is in use executing one or more programs for a user may have various forms and may be initiated in various manners in various embodiments. For example, in at least some embodiments and situations, the PES or other system may make some types of program execution capacity modifications in an immediate manner, while other types of program execution capacity modifications may be performed periodically or otherwise in a recurrent manner (e.g., so as to defer and aggregate multiple modifications that are requested or otherwise determined to be made during a period of time). If multiple program execution capacity modification determinations are aggregated over a period of time, information about the aggregated modification determinations may be used to enhance the performance of the program execution capacity modifications in various manners. For example, if two determined program execution capacity modifications correspond to opposite types of modifications (e.g., to increase and decrease computing node quantity, to increase and decrease available aggregate memory, etc.), the two modifications may be aggregated in various manners, such as by being selected to partially or completely offset each other, or instead by selecting a higher priority of the two modifications to be performed in lieu of the other modification. In addition, if two or more determined program execution capacity modifications correspond to similar or complementary types of modifications (e.g., to all increase computing node quantity by specified amounts, to all increase available aggregate memory by specified amounts, etc.), those determined modifications may similarly be aggregated in various manners (e.g., to select a single determined modification that satisfies some specified criteria, such as the largest, the smallest, the one with the highest priority, the one that was determined first, the one that was determined last, etc.; to accumulate the various determined modifications and use the accumulated modification amount; etc.).

In addition, the program execution capacity of a group of computing nodes may in some embodiments be measured at least in part by the quantity of computing nodes that are part of the group, and may be modified by changing the computing node quantity of the group. Such computing node quantity modifications may be used, for example, in situations in which some or all of the computing nodes in the group provide or have access to the same or similar amounts of computing resources (e.g., amounts of memory, hard drive space, CPU execution cycles, network bandwidth, etc.), such that a given percentage change in computing node quantity corresponds to the same or similar percentage change in total computing resources and program execution capacity of the group. In other embodiments, some or all of the computing nodes of the group may differ in one or more significant manners with respect to the amount of computing resources to which they have access (e.g., if two or more distinct types of computing node configurations are used, if each computing node is configured independently of the other computing nodes, etc.) or otherwise with respect to the types of program execution capacity that they provide (e.g., based on specialized hardware, types of software programs, etc.), but dynamic program execution capacity modifications for the group may nonetheless be based at least in part on modifying a quantity of the computing nodes of the group, or instead may be based in other manners (e.g., changing from one type of computing node configuration to another), as discussed in greater detail elsewhere.

Furthermore, in at least some embodiments and situations, the program execution capacity of a group of one or more computing nodes may be measured and modified in manners other than a quantity of the computing nodes, such as based on an aggregate amount of one or more types of computing resources provided by the group (e.g., amounts of memory, hard drive space, CPU execution cycles, network bandwidth, etc.). In addition, in at least some embodiments, additional factors may be considered in measuring and specifying program execution capacity for a group of computing nodes, such as a geographical location of some or all of the computing nodes, inter-relationships between some or all of the computing nodes (e.g., to be separated by at most a maximum geographical distance or at least a minimum geographical distance, to be separated by at most a maximum network latency or at least a minimum network latency, to be separated into two or more independent data centers or other computing node collections that are unlikely to fail simultaneously, etc.), availability of specialized hardware capabilities and/or software capabilities, etc. Additional details related to measuring and specifying program execution capacity are included below.

As previously noted, users may predefine various types of triggers related to dynamically modifying program execution capacity for groups of computing nodes, and those triggers may be later used to initiate corresponding automated dynamic program execution capacity modifications for computing node groups of the users. As one example, a trigger may be defined that specifies a particular desired quantity of computing nodes or desired aggregate amount of one or more computing resources, such as may be used to automatically maintain a corresponding computing node group at that desired computing node quantity or desired aggregate computing resource amount, or instead to change to a specified computing node quantity or aggregate computing resource amount if specified criteria are satisfied. In other situations, a trigger may be defined that specifies a particular absolute or relative change in computing node quantity or aggregate amount of one or more computing resources, such as may be triggered if one or more indicated performance characteristics of the computing node group reach a specified threshold or otherwise satisfy a specified criteria (e.g., remain within a specified range for a specified period of time; show a particular trend, such as a specified amount of change over a specified period of time, or such as a particular "acceleration" or rate of change; match or other correspond to one or more specified patterns, such as from historical data that indicates recurring patterns of program execution capacity use; satisfy a specified logical or other combination of values for multiple performance characteristics, such as may be combined using logical operators such as AND, NOT, OR, etc. and/or in other manners; etc.). In other embodiments and situations, a predefined trigger may be otherwise satisfied based on information that is not part of the performance characteristics of the computing node group (e.g., based on a current time matching one or more specified times that are part or all of the criteria for a particular trigger; based on status information for one or more programs being executed on the current computing node group that is measured in manners other than performance characteristics, such as a current computing load as indicated by, for example, an amount of work that is queued for or otherwise known or expected to be performed by the one or more programs; based on performance characteristics or other status information for one or more other executing programs that are not being executed by the current computing node group, such as if the current computing node group is interacting with or otherwise supporting the other executing programs so as to, for example, increase the program execution capacity of the current computing node group as the computing load on the other executing programs increases or decreases; etc.). Such performance characteristics may be based on any measurable attribute of or other metric corresponding to the operation of one or more of the computing nodes of the group, including the following non-exclusive list: an absolute or relative amount of use of one or more computing resources of a single computing node (e.g., a percentage amount of available memory being used or CPU cycle utilization, an absolute amount of network bandwidth being used, etc.); an absolute or relative amount of aggregate use of one or more computing resources of all of the group computing nodes; an absolute or relative amount of latency or other delay in responding to communications from external computing systems; an absolute or relative amount of failures of the computing nodes in performing one or more desired actions; etc. Furthermore, in at least some embodiments and situations, rather than having a trigger directly specify a particular program execution capacity modification that is to occur when it is satisfied, the satisfaction of the trigger may cause a designated system or module to be notified, and that system or module may request a particular program execution capacity modification (e.g., a predefined capacity modification that does not vary; a capacity modification that is dynamically determined at the time of the notification, such as based on then-current conditions; etc.). In addition, the PES or other system may in some embodiments perform various operations to monitor a group of computing nodes in order to determine some or all of the performance characteristics for the triggers associated with the group, or may otherwise obtain such monitored performance characteristics from another source (e.g., from third-party software that monitors the computing nodes, from software executing on a computing node to monitor that computing node and optionally report the monitored information, etc.). Furthermore, in some embodiments, the PES or other system may have system-defined triggers that initiate dynamic program execution capacity modifications when indicated trigger criteria are satisfied, or may otherwise automatically determine to make some types of changes to computing node groups in specified circumstances.

When a defined trigger specifies a particular absolute or relative change in computing node quantity or aggregate amount of one or more computing resources, and the modification is automatically authorized by the execution capacity management system, the PES or other system may automatically determine how to perform the specified program execution capacity modification for the trigger. For example, some types of specified program execution capacity modifications may be performed immediately (e.g., a request to terminate use of one or more computing nodes, a request based on a trigger that the user has designated for immediate performance, etc.), while other types of specified program execution capacity modifications may be deferred for a period of time in at least some situations. Similarly, program execution capacity modifications that are dynamically requested by a user (e.g., via a GUI, or graphical user interface of the PES or other system; by a program of the user via a defined API, or application programming interface, of the PES or other system; etc.) may be determined to be performed immediately and/or temporarily deferred in a similar manner, such as based on the type of dynamic program execution capacity modification, based on an explicit request from the user for immediate or deferred performance, etc. Additional details related to using user-defined triggers and determining performance characteristics are included below.

FIG. 1A is a network diagram that illustrates an example of a program execution service 105 that manages computing nodes that are available for use in providing program execution capacity to execute programs for multiple users, and that illustrates an example of an execution capacity management system 135 that automatically governs dynamic modification of program execution capacity being provided by the program execution service 105. In the illustrated embodiment, the program execution service 105 and the execution capacity management system 135 are integrated together into a single network-accessible service 145, but in other embodiments may have other forms (e.g., being separate systems operated by separate entities, being in the form of a single system that includes at least some of the described functionality of both the program execution service and the execution capacity modification system, etc.). In addition, for illustrative purposes, some examples and embodiments are described below in which specific types of program execution capability are provided, managed and dynamically governed in specific manners. Furthermore, in some of the examples and embodiments described below, the program execution capacity that is provided by a group of computing nodes may be measured in particular manners (e.g., based on a quantity of the computing nodes), may be controlled by associated users in various manners (e.g., based on the use of predefined triggers and/or dynamically specified instructions), may be automatically governed in particular manners (e.g., based on predicted ranges of program execution capacity amounts at each of one or more future times), etc. These examples are provided for illustrative purposes and are simplified for the sake of brevity, and it will be appreciated that the inventive techniques may be used in a wide variety of other situations, only some of which are described below.

In the example of FIG. 1A, various users (not shown) are using various client computing systems 130 to interact over a network 100 with the PES 105, which is provided in this example by an entity (not shown) who also provides the execution capacity management system 135 in conjunction with the PES 105. The various users may or may not be aware of the operations that are performed by the execution capacity management system 135 and/or of the existence of the execution capacity management system 135. In this example, at least some of the functionality of the PES is provided by a System Manager module 110 of the PES 105, and other functionality may optionally be provided by other modules (not shown) of the PES 105. The module 110 may, for example, assist particular users in configuring groups of computing nodes to be used to execute programs for the users, including specifying initial desired computing node quantities for the groups and specifying triggers for use in later automatically making dynamic modifications to the computing node quantities. In this example, the PES makes various computing nodes 120 available for executing programs of the users, although in other embodiments at least some of the computing nodes used for at least some of the groups may be provided in other manners (e.g., made available by the users and/or by third-parties, such as external computing systems 140, but managed by the PES). In addition, one or more modules of the PES may assist in continuously or repeatedly monitoring computing node groups that are in use, and optionally attempting to replace any computing nodes that fail or otherwise become unavailable, so as to maintain program execution capacity at previously determined levels.

As the PES 105 provides groups of computing nodes for use by various users, the PES 105 interacts with the ECMS 135 to provide additional functionality to benefit the users, such as in response to fees charged to the users by the PES 105 and/or the ECMS 135. In particular, the illustrated embodiment of the ECMS 135 includes a Capacity Prediction Manager module 125 that generates predictions of program execution capacity amounts that are expected to be used by particular groups of computing nodes at particular future times, such as based at least in part on historical information from the PES 105 about prior execution capacity amounts used by those groups (or related groups) and/or on current or recent information from the PES 105 about ongoing operation of those groups (or related groups). Furthermore, the illustrated embodiment of the ECMS 135 includes a Capacity Governing Manager module 115 that performs actions to automatically govern dynamic modifications made to groups of computing nodes provided by the PES 105, based at least in part on previously made predictions from the module 125 of program execution capacity amounts that are expected to be used those groups of computing nodes. The operations of the modules 115 and 125 may include various interactions with the PES 105, such as to obtain historical information, provide generated predicted information, receive information about requests for dynamic modification of program execution capacity of particular computing node groups, provide instructions based on the automatic governing about whether and how to satisfy particular dynamic modification requests, etc. Additional details are included elsewhere about the generating of predicted program execution capacity amounts and the automatic governing of requests for dynamic modification of program execution capacity based on the generated predicted information.

The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users. In still other embodiments, the network 100 may include one or more private networks with access to and/or from the Internet. In the illustrated embodiment, the modules 110, 115 and 125 may each include software instructions that execute on one or more computing systems (not shown). In addition, the modules and various computing nodes 120 may be provided in various manners, such as at a single data center or otherwise to use a group of co-located computing systems, or instead in a distributed manner using various computing systems in various distinct geographical locations.

Figure 1B:
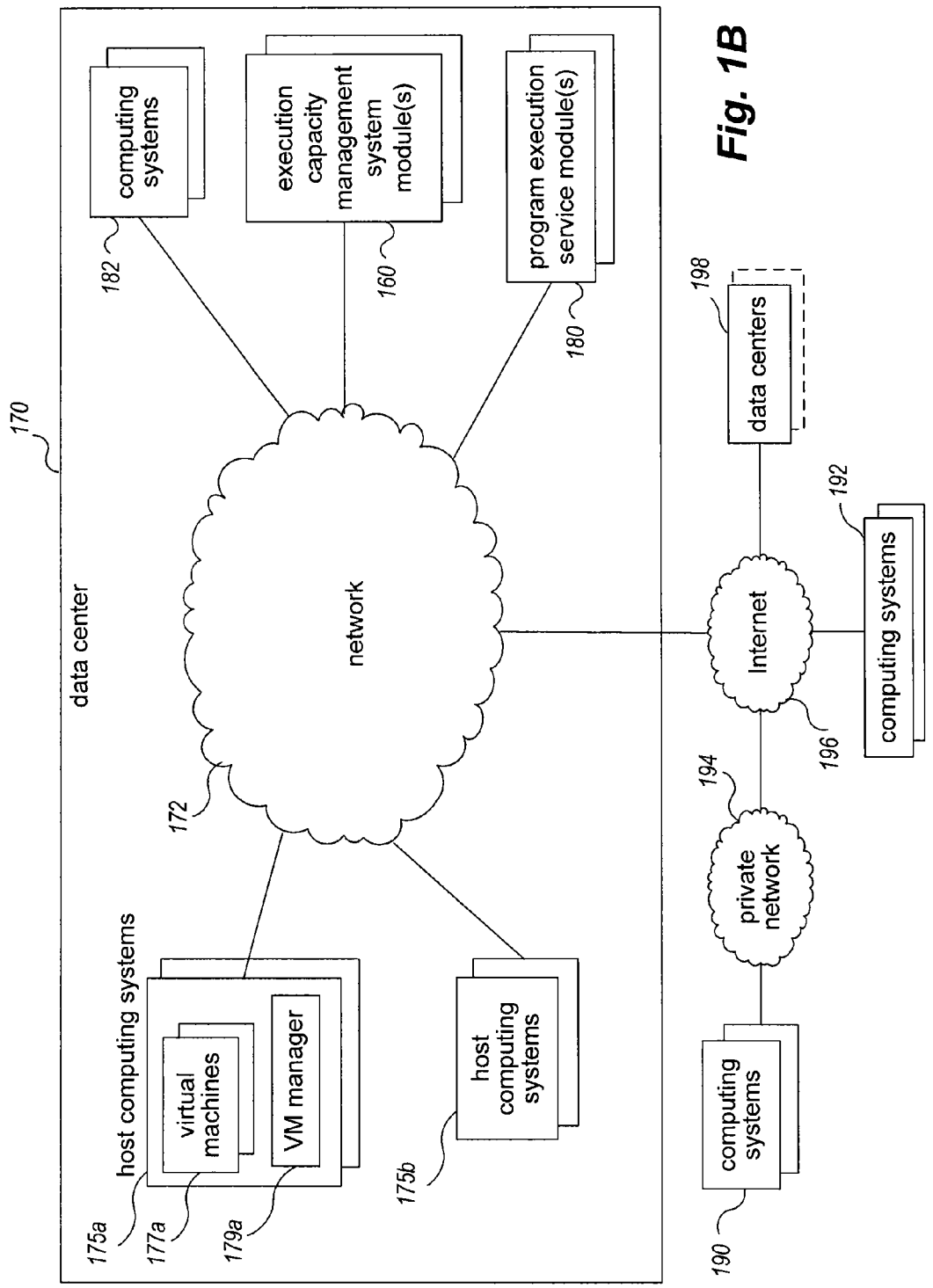

In some embodiments, the illustrated computing nodes 120 may include multiple physical computing systems and/or multiple virtual machines that are hosted on one or more physical computing systems (as is described in more detail with respect to FIG. 1B). Each of the computing nodes 120 has some amount of computing resources available for executing one or more programs, which provide a specific amount of program execution capacity, such as may be measured, for example, by a quantity of one or more such computing nodes and/or by a combination of one or more of processing capacity (e.g., number and/or size of processing units), memory capacity, storage capacity, network bandwidth capacity, etc. In some embodiments, the PES provider 105 may provide preconfigured computing nodes, with each preconfigured computing node having equivalent or otherwise similar amounts of resources available for executing programs on behalf of users, while in other embodiments, the PES provider 105 may provide a selection of various different computing nodes from which a user may choose for executing programs on behalf of the user, such as with each selection having varying amounts and/or types of computing resources (e.g., size, speed and/or type of processing units; number of processing units; amount of memory and/or storage; platform configuration, such as 32-bit or 64-bit; etc.).

In this illustrated embodiment, the program execution service provides functionality for managing groups of one or more computing nodes 120 for each of multiple users. As discussed in greater detail elsewhere, the various users may interact with the module 110 to specify requests to initiate use of groups of computing nodes for execution of programs on behalf of the users. In various embodiments, such resources may be specified at the time of a request for execution of one or more programs on a group of computing nodes on behalf of a user and/or at one or more other times, such as when a user initially registers and/or subscribes to use services of the PES. In some embodiments, the module 110 may provide subscription and/or registration services to one or more users, such that users may specify information related to one or more programs to execute on behalf of a user (e.g., programs, source code, addressable locations of one or more programs, etc.), account information (e.g., user name, billing information, etc.), terms of use, etc. In some embodiments, after a user interacts with the module 110 to subscribe and/or register for services, the user may be issued one or more identifiers (e.g., keys, tokens, user names, etc.) that are associated with the user and are to be used in conjunction with executing programs on behalf of the user. In other embodiments, a module other than the module 110, not shown, may be provided to perform various operations related to subscription and/or registration services of a PES. While the user interacts directly in these manners with the PES 105 rather than the ECMS 135, in other embodiments the user may similarly interact directly with the ECMS 135 to perform some or all some activities, whether instead of or in addition to such interactions with the PES 105.

After a request is received from a user for use of one or more computing nodes, the module 110 may determine whether there are a sufficient number of computing nodes 120 with available resources for satisfying the request, and if so, the module 110 may initiate execution of one or more programs for the request on an appropriate amount of the computing nodes on behalf of the user. In cases where a user schedules a request for future execution of one or more programs on a group of one or more computing nodes, the module 110 may attempt to immediately reserve an appropriate amount of computing nodes for executing the one or more programs at the one or more future times, and/or may delay the determination of which computing nodes to use for execution until a later time (e.g., such as when the one or more future times occur). In the illustrated embodiment, if the module 110 is unable to allocate computing nodes for a user request, the request may fail, such that the programs are not executed. In such cases, the user may resubmit a failed request for later execution. As previously noted, in some embodiments, a user may be charged various fees in association with use of the PES, such as based on a number of computing nodes used, a type of computing nodes used, a duration of time the computing nodes are used, particular operations that the computing nodes perform (e.g., data transfer and/or storage), etc.

After a group of one or more computing nodes is provided for use in executing one or more programs on behalf of a user, the computing node group may be managed in various manners. For example, as previously noted, the PESCMM module 115 may monitor the computing nodes of the group, such as to determine performance characteristics of some or all of the computing nodes, including an actual computing node quantity or other measure of actual program execution capacity being provided by the computing nodes of the group. The actual program execution capacity of the group may change if, for example, one or more of the computing nodes fail or otherwise become unavailable, and in at least some embodiments, the PES 105 may perform various operations to maintain the program execution capacity of the computing node group in such situations (e.g., by initiating the addition of replacement computing nodes to the group in place of the unavailable computing nodes).

In addition, the module 110 may also assist in managing the computing node group in various manners. For example, as previously noted, the user associated with the group may have previously specified one or more quantity modification triggers that specify types of computing node quantity changes to be made to the group (or other types of capacity modification triggers with other specified types of capacity modifications) if various specified criteria are satisfied. Furthermore, in at least some embodiments, the user associated with the group may dynamically specify changes to the operation of their associated computing node group at various times, including to change the quantity of the computing nodes of the group. Furthermore, the module 110 may perform other activities to track events and particular program execution capacity changes that occur with respect to particular computing node groups, and may store information about execution capacity amounts used by particular computing node groups for later use as historical information for generating of predicted execution capacity information.

Although the foregoing example embodiment of FIG. 1A is described with respect to a PES that provides various types of functionality for various users, it will be appreciated that various other embodiments may exist. For example, in at least some embodiments, unused portions of a single one of the computing nodes 120 (e.g., unused processing unit clock cycles, unused portions of memory, etc.) may be made available for use by one or more users, such that one or more programs of a first user may be sharing resources of a single computing node with those of one or more other users. In addition, although some embodiments are described with respect to a program execution service and program execution capacity, it will be appreciated that the described techniques may be used to manage access to various other groups of computing nodes or other types of computing-related resources. A non-exclusive list of examples of other types of computing-related resources that may be managed for use by multiple users may include the following: persistent data storage capabilities (e.g., on non-volatile memory devices, such as hard disk drives); temporary data storage capabilities (e.g., on volatile memory, such as RAM); message queuing and/or passing capabilities; other types of communication capabilities (e.g., network sockets, virtual communication circuits, etc.); database management capabilities; dedicated bandwidth or other network-related resources; input device capabilities; output device capabilities; CPU cycles or other instruction execution capabilities; etc.

FIG. 1B illustrates an embodiment in which a program execution service and associated execution capacity management system may be provided using one or more data centers that include multiple physical computing systems. In particular, FIG. 1B is a network diagram illustrating an example embodiment in which one or more modules 180 of a program execution service (e.g., a system manager module, such as module 110 of FIG. 1A) manage execution of one or more programs on behalf of users using various computing systems at the one or more data centers. In addition, FIG. 1B illustrates one or more modules 160 of an execution capacity management system (e.g., a capacity prediction manager module and a capacity governing manager module, such as modules 115 and 125 of FIG. 1A) that automatically govern dynamic modification of program execution capacity being provided by the program execution service.

The illustrated example includes a data center 170 used by the PES and ECMS, which is connected to the Internet 196 external to the data center 170. In this example, the Internet 196 provides access to various external computing systems, such as computing systems 190 via private network 194 and directly accessible computing systems 192. The private network 194 may be, for example, a corporate network that is wholly or partially inaccessible from non-privileged computing systems external to the private network 194. Computing systems 192 may include, for example, a home computing system that connects directly to the Internet (e.g., via a telephone or cable modem, a Digital Subscriber Line ("DSL"), etc.). In addition, one or more other data centers 198 are illustrated that are connected to data center 170 via the Internet 196, such as may further be used by the PES and/or ECMS in at least some embodiments.

The example data center 170 further includes a number of physical host computing systems 175 and physical computing systems 182, which are interconnected via an internal network 172. In this example, host computing systems 175 each provide multiple virtual machines and have a virtual machine ("VM") manager component to manage those virtual machines (e.g., a hypervisor or other virtual machine monitor), such as is illustrated with respect to host computing system 175a with multiple virtual machines 177a and a VM manager component 179a. The other host computing systems 175b may similarly include such components, but those other components are not illustrated here for the sake of brevity, and some or all of the computing systems 182 may optionally similarly have one or more such virtual machines and/or VM manager components (not shown). Each of the virtual machines provided by a host computing system may be used as a distinct computing node for the PES, such as to have a first virtual machine computing node on a first host computing system and a second virtual machine computing node on a second host computing system each be part of a first computing node group for a first user, and to have another virtual machine computing node on the first host computing system that is part of a second computing node group for a second user. Alternatively, in other embodiments, some or all of the physical host computing systems at the data center may not provide any virtual machines, such as to instead directly act as a computing node that executes one or more programs on behalf of an end user customer of the PES. Furthermore, in some embodiments various of the computing systems 175 and 182 may have differing capabilities, may have different associated fees for use, may support different types of user programs (e.g., virtual machine software image instances of different sizes, or programs with different types of resource criteria and/or computing resource usage, such as differing patterns of I/O and memory access and network usage), etc. If so, particular users and/or their programs may be grouped (e.g., automatically) according to one or more such factors, which may further be used as constraints and/or preferences regarding which computing systems to select for executing particular programs. The internal network 172 of the example data center 170 may further include multiple networking devices (not shown), such as switches, edge routers, and core routers, with computing systems 175 and 182, the module(s) 160, and the module(s) 180 connected to the internal network 172. The various host computing systems 175 and other computing systems 182 may be arranged in various manners, including by being grouped in racks that share common backplanes or other interconnection mediums. Furthermore, each of the modules 160 and 180 may be executed using one or more computing systems (not shown).

The illustrated module(s) 180 perform at least some of the described techniques of an embodiment of a PES in order to manage execution of programs on groups of computing nodes that are provided using the computing systems 175 and 182, as described in greater detail elsewhere. Similarly, the illustrated module(s) 160 perform at least some of the described techniques of an embodiment of an ECMS in order to automatically govern program execution capacity being provided by groups of computing nodes using the computing systems 175 and 182, as described in greater detail elsewhere. When a particular computing node is selected to execute one or more programs of a user, the module(s) 180 may in some embodiments initiate execution of those programs by interacting with a VM manager component or other manager component that controls execution of programs for that selected computing node, or may alternatively directly execute the programs on the selected computing node. Users of the PES may use various computing systems to interact with the module(s) 180, such as computing systems 190 or 192, or computing systems at one of the other data centers 198.

It will be appreciated that the data center of FIG. 1B is provided for illustrative purposes only, and that program execution services (and other software execution services) and/or an execution capacity management system may be provided in other manners in other embodiments, including to provide a PES and ECMS in different geographical and network locations. For example, module(s) 180 and/or module(s) 160 may instead be provided using one or more other computing systems external to the data center 170, such as computing systems 190, 192 or at a data center 198.

Figure 2A:
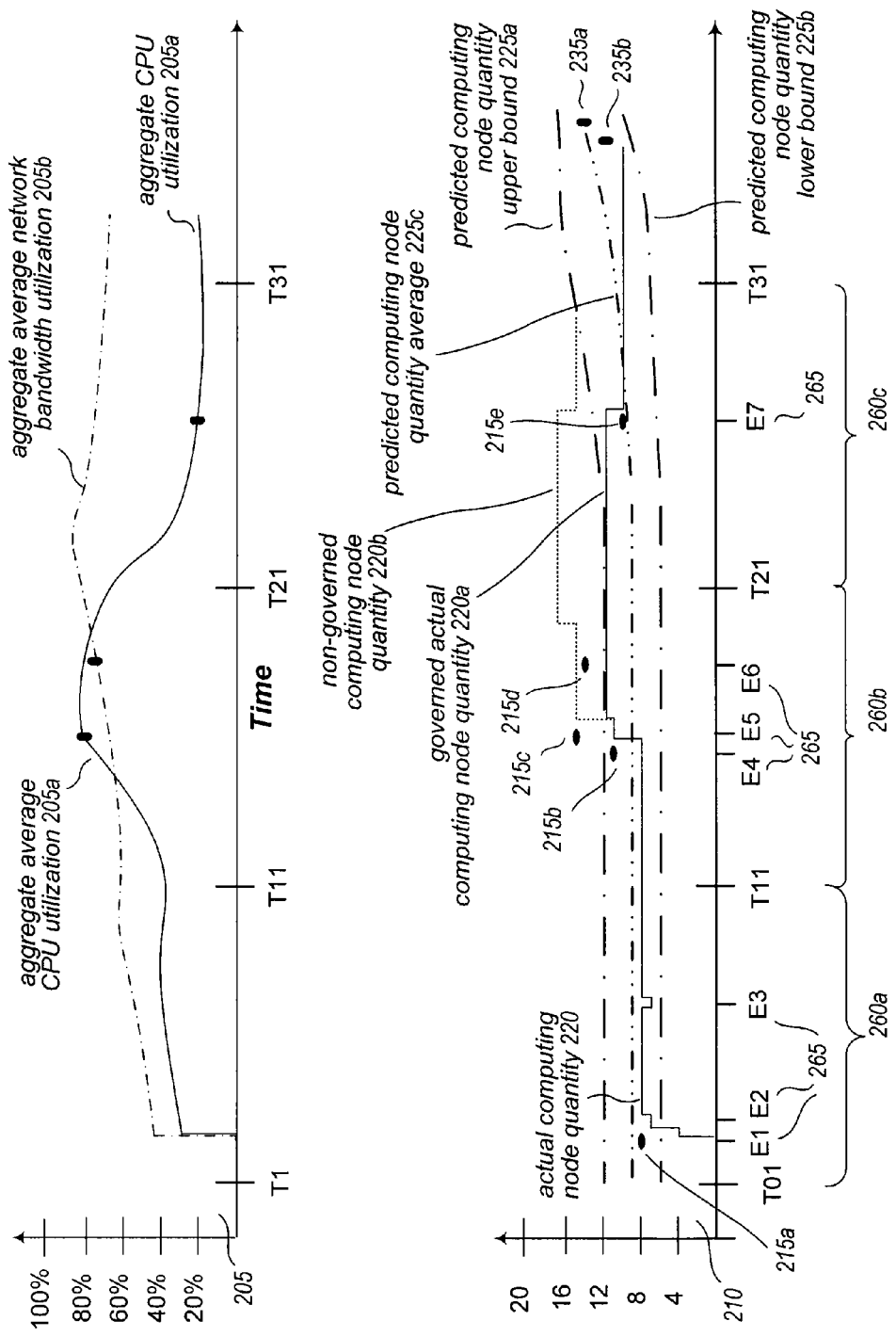

FIGS. 2A-2B illustrate examples of techniques for managing an example group of computing nodes that are provided to execute one or more programs of an example user, such as techniques that may be automatically performed by one or more modules of an example embodiment of an execution capacity management system. In particular, in the example of FIG. 2A, the program execution capacity being provided for a particular example user (referred to as User UUU below, and not shown in FIG. 2A) is provided by an example program execution service ("PES") that implements the execution capacity management system, and the provided program execution capacity is dynamically modified during the execution of a software program for various reasons, with the dynamic modification being automatically governed in this example based on the use of predicted execution capacity information for the execution of the software program. In addition, the program execution capacity of a group of computing nodes and the dynamic modifications to the program execution capacity are represented by quantities of computing nodes, although program execution capacity may be measured and modified in other manners in other embodiments, as discussed in greater detail elsewhere. FIG. 2B provides additional details regarding the examples discussed with respect to FIG. 2A.

In FIG. 2A, the example user has initiated the use of a group of multiple computing nodes to execute one or more copies of an indicated software program on behalf of the user, such as for the multiple computing nodes to each execute a copy and to serve as an alternative to handle requests received by a service that is provided by the executing program (e.g., in order to balance the computing load for the service across the multiple computing nodes of the group). As is illustrated in the timeline graph 210 of FIG. 2A, the user has initiated an event E1 at approximately time T03 that requests that the computing node group be provided, and has specified an initial computing node quantity 215a of 8 computing nodes for the group. Information 250 of FIG. 2B further indicates various user-defined triggers that the user has specified for the computing node group, such as at the time of the initial request, although in other embodiments some or all of the triggers may be specified in other manners (e.g., at other times, such as during the use of the group of computing nodes; by other entities, such as automatically by a PES that is providing the group of computing nodes and/or by an execution capacity management system that is managing the execution capacity being provided by the group of computing nodes; etc.). In addition, timeline graph 205 of FIG. 2A illustrates information about two example types of performance characteristics that will be monitored for the computing node group and that will be used to determine whether various of the triggers 250 are satisfied, which in this example includes aggregate average CPU utilization 205a for the computing node group and aggregate average network bandwidth utilization 205b for the computing node group.

In response to the event E1 corresponding to the received user request to initiate the providing of the computing node group, an example PES (not shown) initiates a computing node group for the user that initially includes eight computing nodes, in accordance with the initial computing node quantity. As is shown in the timeline graph 210, however, the eight computing nodes are not actually immediately available, as it takes some time to provision and make available the computing nodes for use as part of the computing node group, including having the program copy be executed on each of the computing nodes by the PES or the user. In particular, after an initial brief time has passed after event E1, some program execution capacity for the computing node group becomes available, which corresponds to a first four of the eight computing nodes being available. Accordingly, the illustrated actual computing node quantity 220 for the computing node group increases from 0 to 4 at that time. In addition, at the same time or shortly thereafter, the timeline graph 205 indicates that the aggregate average CPU utilization 205a and aggregate average network bandwidth utilization 205b performance characteristics begin to be tracked based on operation of the available computing nodes of the group. Shortly after the first four computing nodes become available, a subsequent change in the available program execution capacity from the group corresponds to three additional computing nodes becoming available for use as part of the computing node group, as illustrated by the actual computing node quantity information 220 at approximately time T04. However, the final of the initial eight computing nodes does not become available within the group in this example until an additional time after the other seven computing nodes are already available. In the current example, a hardware problem occurred with the computing node that is initially selected to be the eighth computing node, although in other situations, a similar delay may occur if only 7 total computing nodes were initially available for use in the computing node group (with the eighth computing node being dynamically added as soon as it later becomes available). Accordingly, an event E2 265 is shown occurring shortly after the event E1 in this example, at approximately time T4, in which the PES terminates the original eighth computing node if appropriate (e.g., if it is frozen in an intermediate state), and initiates the providing of a replacement eighth computing node.

While the time intervals (e.g., from time T01 to time T02, from time T02 to time T03, etc.) may have varying durations in various embodiments, in the illustrated example the time intervals correspond to approximately an hour each, with the time to provision a computing node and make it available within the group being, for example, between 5 minutes and an hour. In addition, the computing nodes within the group may optionally be considered for dynamic modification once each time interval, as discussed further below, although in other embodiments the dynamic medication consideration may be performed in other manners (e.g., substantially continuously, a specified number of times per time interval, once for each specified number of time intervals, etc.), including to aggregate at least some types of requested modifications for consideration together. In addition, in this example, the PES (or other third-party system) performs monitoring of the computing nodes of the group in a substantially continuous manner, such that the performance characteristics 205a and 205b and the actual computing node quantity 220 information is maintained in an up-to-date manner.

After the eight computing nodes of the computing node group operate in the intended manner for several time intervals, a change occurs in the actual computing node quantity 220 at approximately time T7, prompted by one of the computing nodes of the group failing or otherwise becoming unavailable. A corresponding event E3 265 is shown at approximately the same time as the change, in which the PES terminates the unavailable computing node as needed, and in this example automatically initiates the providing of a replacement computing node. Subsequently, in this example, a change is completed at approximately time T08 that returns the actual computing node quantity 220 to eight as the replacement computing node becomes available for use as part of the computing node group. No other computing node capacity availability changes or related events occur in this example during the remainder of the initial time period 260a from time T01 to time T11, including none of the specified triggers 250 being satisfied so as to trigger a possible dynamic program execution capacity modification for the group, and no specified user instructions for such dynamic program execution capacity modification being received.

During the second time period 260b from time T11 to time T21, additional events do occur, however. In particular, an event E4 265 first occurs at approximately time T15, in which the user associated with the computing node group provides a dynamically specified request to increase the computing node quantity of the group by 3 computing nodes, for a total requested computing node quantity 215b of eleven (or alternatively could request that the updated desired computing node quantity be set to eleven, regardless of the current computing node quantity). This request may be made, for example, based on the user noticing that the aggregate average CPU utilization 205a is rising quickly, that the total computing load on the computing node group is increasing, etc. Accordingly, the system initiates an increase of three computing nodes for the user's group, as reflected in the corresponding increase in the actual computing node quantity 220 and corresponding increase in program execution capacity for the group that occurs shortly after event E4. In some embodiments, the execution capacity management system may not automatically govern such user-initiated modifications to program execution capacity based on predicted execution capacity information, as discussed in greater detail below with respect to dynamic modification requests that are automatically triggered, while in other embodiments the execution capacity management system will automatically govern some or all such user-initiated modifications to program execution capacity based on predicted execution capacity information.

After a short additional time has passed, at approximately time T16, a next event E5 occurs that corresponds to an automated determination by the PES that trigger TR-1 250a (as shown in FIG. 2B) has been satisfied by the increasing aggregate average CPU utilization 205a, as is graphically illustrated in the timeline graph 205 with a first black oval on the aggregate average CPU utilization 205a line. The trigger TR-1 satisfaction initiates a request to increase the computing node quantity by 4 computing nodes, for a total requested desired computing node quantity 215c of fifteen (or alternatively could request that the updated desired computing node quantity be set to fifteen, regardless of the current computing node quantity). In particular, in this example, the program execution capacity of the group has just been increased by 3 computing nodes before the event E5 is automatically triggered, but the new computing nodes have not had sufficient time to level or reduce the aggregate average CPU utilization before the threshold from the trigger TR-1 is reached. Thus, from a conceptual standpoint, events E4 and E5 are both attempting to address the same underlying issue, with event E5 being at least partially redundant with respect to event E4.

In the illustrated example, before fulfilling the request initiated by the automated trigger TR-1, the execution capacity management system automatically governs some or all such automated dynamic requests for program execution capacity modification, and in particular performs the automatic governing based at least in part on predicted execution capacity information. In particular, in this example, the execution capacity management system has previously generated prediction information related to the program execution capacity that is expected to be used by the group of computing nodes at multiple future times, such as is reflected in a range of predicted computing node quantities for the group at each of multiple future times that has an predicted computing node quantity upper bound 225a and a predicted computing node quantity lower bound 225b, as well as a predicted computing node quantity average 225c. As discussed in greater detail elsewhere, the predicted information may be generated at various times (e.g., before the use of the computing node group is initiated, optionally with later updates during the use of the computing node group, such as based on actual performance characteristics from the use of the computing node group; when the use of the computing node group is initiated, optionally with later updates during the use of the computing node group; after the use of the computing node group has been initiated, optionally with later updates during the use of the computing node group; etc.), and may be generated in various manners (e.g., by generating predicted time-series data based on assessing historical time-series data and adjusting it to reflect one or more of a variety of factors).

In order to perform the automatic governing of the requested program execution capacity modification from event E5, the execution capacity management system first determines if the new program execution capacity that would result from the requested modification is within the range that was previously predicted for the current time, and optionally may further determine if one or more other criteria are also satisfied, as discussed in greater detail elsewhere. In this example, the new program execution capacity that would result from the requested modification from event E5 is a total computing node quantity of fifteen, which is outside the range of predicted computing node quantities for the current time (in particular, is larger than the predicted upper bound of 12 computing nodes for the current time). Accordingly, in the illustrated example, the execution capacity management system selects an altered new amount of program execution capacity that is equal to the predicted upper bound for the current time, and initiates an alternative modification that will raise the total program execution capacity to the altered new amount, although in other embodiments other actions may be taken instead of or in addition to initiating such an alternative modification—thus, in this example, the alternative modification is for 1 additional computing node to be added to the eleven computing nodes currently in the group, to the altered new total amount of twelve computing nodes. Accordingly, the system initiates the increase for the alternative modification, as reflected in the corresponding increase in the actual computing node quantity 220 and corresponding increase in program execution capacity for the group that occurs shortly after event E5. For comparison purposes, the current example illustrates not only the governed actual computing node quantity 220a that results after event E5, but also illustrates a separate hypothetical non-governed computing node quantity 220b that might have result if the dynamic program execution capacity modification requests were not governed based at least in part on the predicted execution capacity information.

After further additional time has passed, an event E6 265 next occurs at approximately time T18, corresponding to an automated determination that trigger TR-N 250c of FIG. 2B has been satisfied by the increasing aggregate average network bandwidth utilization 205b, as is graphically illustrated in the timeline graph 205 with a black oval on the aggregate average network bandwidth utilization 205b line. In particular, in this example, while the addition of the four computing nodes to the group based on events E4 and E5 initiates a gradual reduction in the aggregate average CPU utilization values, but the aggregate average network bandwidth utilization has continued to slowly rise (e.g., based on the new computing nodes being added at network locations that do not have sufficient excess network bandwidth for the new computing nodes to reduce the aggregate average utilization). The trigger TR-N satisfaction initiates a request to increase the desired computing node quantity by 2 computing nodes, for a total requested desired computing node quantity of 215d of fourteen based on the group currently having twelve computing nodes (or alternatively could request that the updated desired computing node quantity be set to a specific quantity, such as fourteen or seventeen, regardless of the current computing node quantity), although the total requested desired computing node quantity would instead be for seventeen computing nodes if the previous request corresponding to event E5 had not been automatically governed, as illustrated by the subsequent hypothetical non-governed computing node quantity 220b. In the illustrated example, before fulfilling the request initiated by the automated trigger TR-N, the execution capacity management system automatically governs the request based at least in part on the predicted execution capacity information, in a manner similar to that previously described with respect to event E5. In particular, with respect to event E6, the execution capacity management system first determines if the new program execution capacity that would result from the requested modification is within the range that was previously predicted for the current time. In this example, the new program execution capacity that would result from the requested modification from event E6 is above the range of predicted computing node quantities for the current time, since the quantity of computing nodes in the group was previously set to the upper bound, and since the predicted information is constant for the first twenty-four time intervals of operation (e.g., if the predicted data is generated at a granularity of a particular day, such that each day has consistent predicted values throughout the day, but the predicted values may vary from day to day). Accordingly, in the illustrated example, the execution capacity management system determines not to make the requested modification, and instead leaves the execution capacity of the group at its current level, although in other embodiments other actions may be taken instead of or in addition to such a determination to make no change—thus, in this example, the continuing total amount of execution capacity for the group is twelve computing nodes.

During the third time period 260c, one or more additional events and computing node capacity availability changes may further occur. In particular, in this example, the aggregate average CPU utilization 205a eventually drops below a threshold of 20% corresponding to a criterion specified for trigger TR-3 250b of FIG. 2B, causing an event E7 to occur that includes a determination that trigger TR-3 250b has been satisfied, as is graphically illustrated in the timeline graph 205 with a second black oval on the aggregate average CPU utilization 205a line. The trigger satisfaction initiates an automated request to decrease the desired computing node quantity by 2 computing nodes, for a total requested desired computing node quantity 215e of ten (or alternatively could request that the updated desired computing node quantity be set to ten, regardless of the current desired computing node quantity), although the total requested desired computing node quantity would instead be for fifteen computing nodes if the previous requests corresponding to automatically initiated events E5 and E6 had not been automatically governed, as illustrated by the subsequent hypothetical non-governed computing node quantity 220b. In the illustrated example, before fulfilling the request initiated by the automated trigger TR-3, the execution capacity management system automatically governs the request based at least in part on the predicted execution capacity information, in a manner similar to that previously described with respect to events E5 and E6. In particular, with respect to event E7, the execution capacity management system first determines if the new program execution capacity that would result from the requested modification is within the range that was previously predicted for the current time. In this example, the new program execution capacity that would result from the requested modification from event E7 is within the range of predicted computing node quantities for the current time, since the request lowers the current quantity of computing nodes in the group that was previously set to the upper bound, although the predicted quantity information is increasing during the second twenty-four time intervals of operation. Accordingly, in the illustrated example, the execution capacity management system accepts the requested new amount of program execution capacity of ten computing nodes as being authorized based at least in part on being within the previously predicted range for the current time, and initiates the requested modification to lower the total program execution capacity to the requested new amount. Accordingly, the system initiates the decrease for the requested modification, as reflected in the corresponding decrease in the actual computing node quantity 220 and corresponding decrease in program execution capacity for the group that occurs shortly after event E7.

In addition, in some embodiments, the predicted execution capacity information may be used in other manners, whether instead of or in addition to automatically governing dynamic modifications to execution capacity for a group of computing nodes. For example, in some embodiments, the predicted execution capacity information may be used to initiate actions that are expected before they occur, such as to begin to provision one or more additional computing nodes for use in the group before a request is made for those additional computing nodes. In the example, the predicted information includes a predicted computing node quantity average 225c for each of multiple future times (e.g., a mean or midpoint or other average value for the range at a particular future time), including a predicted average 235a of approximately 14 computing nodes for a future time of approximately T37. Accordingly, in some embodiments, the execution capacity management system may use such predicted average information to initiate advance provisioning of computing nodes in at least some situations (e.g., if the current computing node quantity at a time is sufficiently different from the predicted average information for that time, such as more than a threshold amount)—in this example, the execution capacity management system may automatically create a new event (not shown) that corresponds to a request at time T36 to initiate advance provisioning of a specified quantity of additional computing nodes if the current computing node quantity of the group at time T36 is less than a threshold value 235b at that time, such as with the specified quantity of additional computing nodes being some or all of the difference between the current computing node quantity at the time and the predicted average quantity at the time. Various other related actions may be taken in other embodiments, as discussed in greater detail elsewhere.

In addition, while the dynamic modification activities corresponding to events E4, E5 and E7 are illustrated in this example as each occurring at a single point in time, it will be appreciated that some or all such activities may actually take place over a period of time, and further may have other effects that last over a period of time. For example, in at least some embodiments, some or all changes to program execution capacity of a computing node group that are initiated by the execution capacity management system may result in a temporary lockdown period in which at least some other types of changes may not be allowed. The program execution capacity changes that may cause such a lockdown may include, for example, program execution capacity increases and/or decreases that are automatically initiated by the execution capacity management system (e.g., to add new computing nodes, to remove existing computing nodes, etc.), and/or program execution capacity changes that are initiated immediately in response to a PES determination (e.g., a computing node failure, receipt of a user instruction, etc.). Such lockdowns may have durations of various types (e.g., until a specified result or occurrence, such as until a computing node being added has become available; a specified length of time, such as the average or expected time for a computing node being added to become available; etc.), and in some embodiments may vary based on the type of change. During such lockdowns, at least some types of events or changes may not be allowed, such as to not allow user-specified triggers to be satisfied (or by ignoring any such trigger satisfactions) during the lockdown duration, and/or to not allow user instructions to be accepted (or by ignoring any such user instructions) during the lockdown duration. Furthermore, in some embodiments, a user associated with a computing node group may similarly specify a cooldown period that operates in a similar manner to that of a lockdown, such as a cooldown period of a specified amount of time that follows a lockdown, or instead takes effect at other times. As with the lockdown, during the cooldown period, at least some types of events or changes may not be allowed, such as to not allow user-specified triggers to be satisfied (or by ignoring any such trigger satisfactions) during the cooldown period. It will be appreciated that users and/or the PES may control modifications to computing node groups in other manners in other embodiments.

FIG. 2B illustrates information previously discussed with respect to FIG. 2A, including example trigger information 250 and example event information 290. In particular, FIG. 2B illustrates an example database table data structure 290 that stores various information related to the example events that occurred for the example computing node group Group1 of FIG. 2A. Example table 290 includes a variety of rows or entries 295a-295g that each corresponds to one of the example events E1-E7 discussed with respect to FIG. 2A, with various fields or columns 290a-290f illustrated for each row. In particular, in this example, each row includes a unique identifier ("ID") 290a, an ID 290b of the applicable computing node group to which the event corresponds, a type 290c of the event, information 290d about the source of the event, a time 290e of the event, an example time period 290f during which the event takes place or otherwise with which the event is associated, and optionally various other information (e.g., a particular user associated with received user instructions). As one illustrative example, row 295d corresponds to event E4 for Group1, which corresponds to a received user instruction at time T15 during the second time period that requests that the desired computing node quantity of Group1 be increased by 3 computing nodes. The other rows include similar information.

Thus, in this manner, the execution capacity management system operates to manage the program execution capacity provided to a user by a group of computing nodes, including to make various dynamic modifications to the computing node group based on a variety of circumstances. It will be appreciated that the events and changes discussed in FIGS. 2A and 2B are provided for illustrative purposes only, and that actual events, changes and other operations of an execution capacity management system and/or a PES may differ in other embodiments and situations. In addition, the preceding examples of FIGS. 2A and 2B are provided for illustrative purposes, and other embodiments may differ in various ways from the examples. For example, although the program execution capacity is measured and modified based on a quantity of computing nodes in these examples, such as if the various available computing nodes are treated as being equivalent (e.g., having equivalent computing resources), other embodiments may be provided where various of the available computing nodes may be of different types with varying characteristics (e.g., different amounts of processing capacity, memory, platform specification, etc.), and/or in which program execution capacity is tracked in manners other than computing node quantity. In some such embodiments, various of the requests may include indications of one or more specific types of the computing nodes for use in groups of computing nodes selected to execute programs associated with the requests, and those requests may only be fulfilled on the corresponding specified type of computing node.

In addition, in at least some embodiments, a PES or other system may further perform other types of activities as part of managing groups of computing nodes. For example, as previously noted, the PES or other system may determine to add or remove computing nodes from a computing node group at various times, including the following: in response to one or more satisfied triggers; in response to a received user instruction; in response to automated activities of the PES or other system, such as to replace a failed computing node and/or to terminate and remove a computing node whose ongoing operation is inhibited; etc. In at least some embodiments, the PES or other system may further consider other factors when determining the exact timing for at least some such computing node group modifications. For example, in situations in which a user will be held responsible for the use of a given quantity of computing nodes for a given period of time (e.g., has already been charged for X computing nodes for the next hour), such information may be used to determine timing related to at least some types of modifications to the computing node group. If the PES or other system determines to reduce the quantity of computing nodes in the group below X, the PES or other system may determine to wait until near or at the end of a time period (e.g., the end of the hour for which the user has already been charged) before actually reducing the computing node quantity below X.

As previously discussed, various types of functionality may be provided and used by a PES in various embodiments, and the functionality may be provided in various ways. For example, in some embodiments, program execution capacity available from a PES may include multiple computing nodes for executing programs on behalf of users, such as via multiple physical computing machines interconnected via one or more networks or other data exchange mediums that are capable of transmitting data between the computing machines. At least some of the computing machines may in some embodiments each include sufficient computing-related resources to execute multiple programs simultaneously (e.g., sufficient writeable memory, non-volatile storage, CPU cycles or other CPU usage measure, network bandwidth, swap space, etc.), and at least some of the computing machines in some such embodiments may each host multiple virtual machine computing nodes that each may execute one or more programs on behalf of a distinct user. Furthermore, in various embodiments, a PES may execute various types of programs on behalf of multiple users. For example, such programs executed on behalf of users may include one or more operating systems, applications (e.g., servers and/or other software applications), utilities, libraries, etc. In addition, in at least some embodiments, such programs may include executable software images, such as virtual machine images that are bootable or otherwise loadable on one or more virtual machine computing nodes, and that each may include operating system software, software for one or more application programs, and/or configuration information, etc. Furthermore, while program execution capacity modifications are made in some examples by changing computing node quantity, in other embodiments such capacity modifications may be made by changing the program execution capacity of one or more computing nodes of the group (e.g., by replacing a first computing node with a second computing node that has more or less of one or more types of computing resources of interest, by modifying the amount of one or more computing resources that are available to one of the computing nodes that are already part of the group, etc.).

In at least some embodiments, the execution of one or more programs on a group of one or more computing nodes by a PES may be initiated in response to a current execution request for immediate execution of those programs. Alternatively, the initiation may be based on a previously received program execution request that scheduled or otherwise reserved the then-future execution of those programs for the now-current time. Program execution requests may be received in various ways, such as directly from a user (e.g., via an interactive console or other GUI provided by the program execution service), or from an executing program of a user that automatically initiates the execution of one or more other programs or other instances of itself (e.g., via an API provided by the program execution service, such as an API that uses Web services). Program execution requests may include various information to be used in the initiation of the execution of one or more programs, such as an executable or other copy of a program to be executed, an indication of a program that was previously registered or otherwise supplied for execution, and a number of instances of the program that are to be executed simultaneously (e.g., expressed as a single desired number of instances, as a minimum and maximum number of desired instances, etc.), as well as a variety of other types of preferences and/or requirements for execution of one or more programs (e.g., resource allocation, geographical and/or logical location for execution, proximity of execution to other programs and/or computing nodes, timing-related criteria, etc.).

After receiving a request to execute one or more instances of a program at an indicated time, the PES may determine one or more computing nodes to use in a group for executing the program instances. In some embodiments, the determination of the computing nodes to be used is performed at the time of the request even if for future execution. In other embodiments, the determination of the computing nodes to be used for future execution of one or more program instances may be deferred to a later time, such as at the future time of execution based on information that is then available. In some embodiments, the determination of which computing nodes to use for execution of one or more programs on behalf of a user may be made prior to a request to execute, such as at a time when a user subscribes and/or registers to use the PES, and/or at another time prior to a request to execute programs for a user. For example, in some such embodiments, one or more computing nodes may be associated with a user for a period of time, such that programs may be executed on behalf of that user on the associated computing nodes at any time during that period, such as at any time a request is received to execute software for the user during the period. In addition, in some embodiments, the determination of which computing nodes to use to execute programs on behalf of a user may be made when one or more computing nodes and/or computing resources of one or more computing nodes become available for executing programs for the user, such as, for example to execute programs of one or more pending requests on one or more computing nodes at a time when the computing nodes are unused and/or are otherwise available for executing the programs. The determination of which computing nodes to use for execution of each program copy or instance may be made in a variety of ways, including based on any preferences and/or requirements specified in the request or otherwise specified for the program and/or associated user (e.g., at a time of registration, etc.). For example, if criteria are determined for preferred and/or required resources for execution of a program instance (e.g., memory and/or storage; CPU type, cycles or other performance metric; network capacity; platform type, etc.), the determination of an appropriate computing node to execute a program instance may be based at least in part on whether a computing node has sufficient resources available to satisfy those resource criteria. Additional details related to executing and configuring programs to execute on a program execution service are included in pending U.S. patent application Ser. No. 11/395,463, filed Mar. 31, 2006 and entitled "Managing Execution of Programs by Multiple Computing Systems," which is hereby incorporated by reference in its entirety.

In some embodiments, fees may be associated with the use of a PES and/or an ECMS, such that the PES may execute programs on behalf of a user in exchange for payment of one or more fees by that user, and/or such that the ECMS may automatically govern program execution capacity on behalf of a user in exchange for payment of one or more fees by that user. For example, in some embodiments, fees may be charged to a user of functionality from an ECMS based on amount of functionality provided (e.g., a duration of time during which the functionality is available, a number of times that the functionality is used, etc.), such as to perform generation at a particular time of predicted execution capacity information for one or more future times and/or to use predicted execution capacity information to automatically govern a particular request for dynamic modification of execution capacity being provided. In addition, in some embodiments, fees may be charged to a user of functionality from a PES based on an amount and/or type of program execution capacity allocated for executing one or more programs on behalf of a user, such as based on one or more of a number of processing units, an amount of memory, an amount of storage, an amount of network resources, etc., allocated for executing programs of the user. In some embodiments, fees may be based on other factors, such as various characteristics of the computing resources used to execute programs, such as, for example, based on CPU capabilities or performance, platform type (e.g., 32-bit, 64-bit, etc.), etc. In some embodiments, fees may be charged on the basis of a variety of use factors, such as a price per use of the service, a price per unit of time that computing services are used, a price per storage used, a price per data transferred in and/or out, etc. In at least some embodiments, as discussed in more detail below, fees may be based on various other factors, such as various properties related to executing programs (e.g., continuity of execution, fault tolerance, etc.). In at least some embodiments, a provider of a PES may offer one or more of various tiers, types and/or levels of services or functionality for executing programs on behalf of multiple users, and in some such embodiments, various fees may be associated with the various tiers, types and/or levels of services. In addition, for example, tiers may be used for a specific type of functionality provided by a PES, such as to charge fees at a first tier for a first quantity of program execution capacity functionality (e.g., up to a specified first threshold of computing nodes being used), to charge fees at a second tier (e.g., a lower price tier) for a second quantity of program execution capacity functionality (e.g., above the specified first threshold and up to a specified second threshold of computing nodes being used), etc. Additional details related to various fees associated with a program execution service are included in pending U.S. patent application Ser. No. 11/963,331, filed Dec. 21, 2007 and entitled "Providing Configurable Pricing for Execution of Software Images," which is hereby incorporated by reference in its entirety.

Furthermore, various other types of functionality may be provided and used by a PES in various embodiments, as discussed in greater detail elsewhere.

Figure 3:
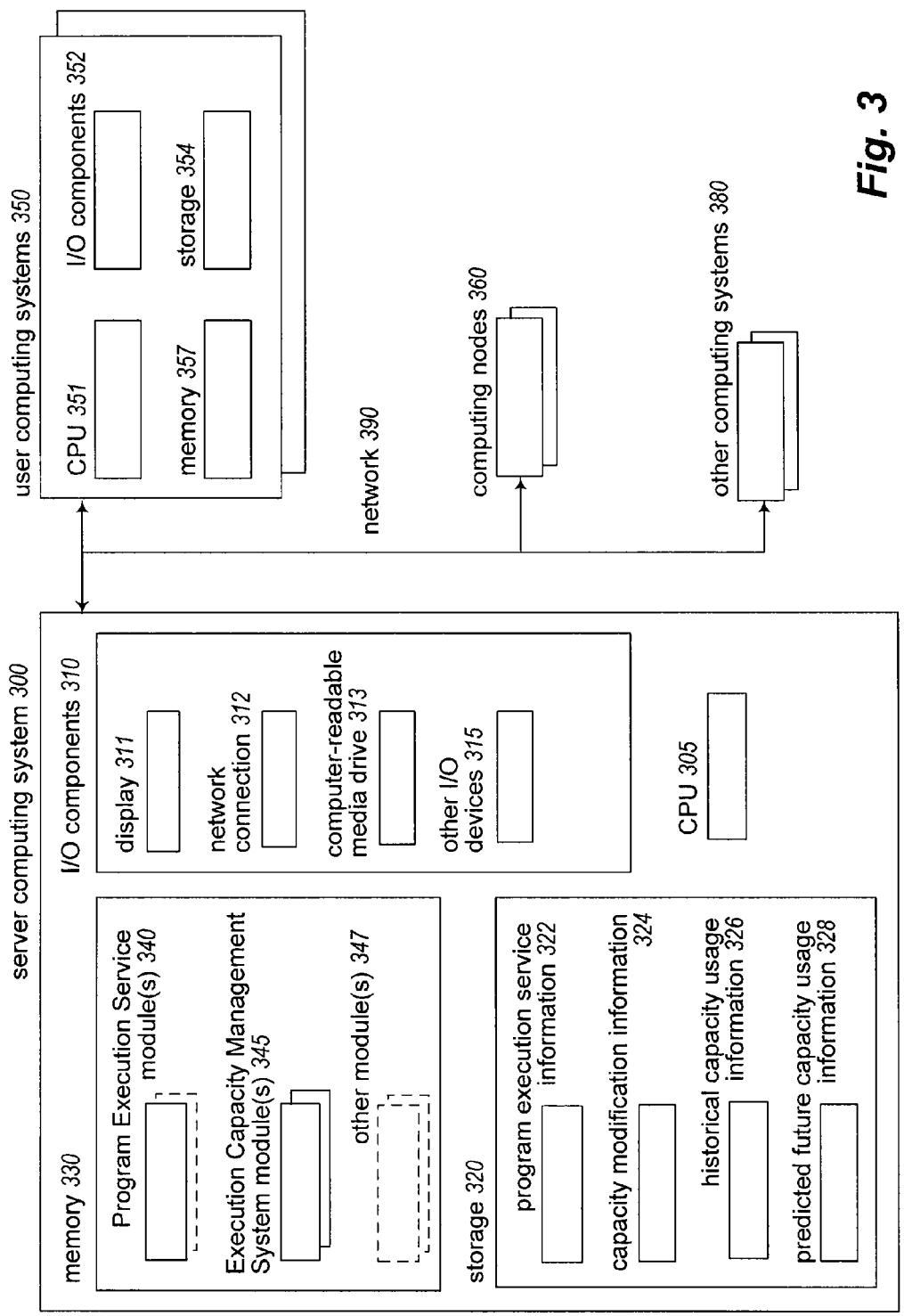
FIG. 3 is a block diagram illustrating an example embodiment of a computing system for managing program execution capacity provided to multiple users.

FIG. 3 is a block diagram illustrating example computing systems suitable for performing techniques to manage groups of computing nodes for multiple users. In particular, FIG. 3 illustrates a server computing system 300 suitable for providing at least some functionality of a program execution service and of an execution capacity management system, although in other embodiments multiple computing systems may be used for the execution (e.g., to have distinct computing systems executing the program execution service and of the execution capacity management system). FIG. 3 also illustrates various client computing systems 350 that may be used by users of the program execution service and/or of the execution capacity management system, computing nodes 360 that may be used by the program execution service, and other computing systems 380. In the illustrated embodiment, the server computing system 300 has components that include one or more CPU ("central processing unit") computer processors 305, various I/O ("input/output") components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 may each have components similar to those of server computing system 300, including one or more CPUs 351, I/O components 352, storage 354, and memory 357. The other computing systems 380 and computing nodes 360 may also each include components that are similar to some or all of the components illustrated with respect to server computing system 300, but such components are not illustrated in this example for the sake of brevity.

An embodiment of one or more modules 340 of a program execution service (e.g., a system manager module, such as module 110 of FIG. 1A) are executing in memory 330, and in some embodiments each includes various software instructions that when executed program one or more of the CPU processors 305 to provide the described functionality. The module(s) 340 interact with computing systems 350 and 380 and computing nodes 360 over the network 390 (e.g., via the Internet and/or the World Wide Web, via a private cellular network, etc.). In this example embodiment, the module(s) 340 include functionality related to managing use of multiple computing nodes 360 by various users (not shown) interacting with user computing systems 350, such as in conjunction with a program execution service provided by the module(s) 340. The other computing systems 350 and 380 and computing nodes 360 may be executing various software as part of interactions with the module(s) 340. For example, user computing systems 350 may be executing software in memory 357 to interact with module(s) 340 (e.g., as part of a Web browser or specialized client-side application program), such as to configure and/or request execution of programs on behalf of the users of those systems on one or more computing nodes 360 in various ways, as well as to perform various other types of actions, as discussed in greater detail elsewhere. Various information related to the functionality of the module(s) 340 may be stored in storage 320, such as information 322 related to configuration, execution and/or registration for executing programs on behalf of multiple users, information 324 related to program execution capacity modifications for computing node groups (e.g., information about predefined user-specified triggers; information about dynamically specified capacity modification instructions from users; information about computing node performance measurements and other information related to determining if specified triggers are satisfied; etc.), and information 326 related to historical execution capacity usage information for users and/or software programs.

After the module(s) 340 receive requests (or other indications) to execute one or more programs on a group of one or more computing nodes 360, the module(s) 340 select the one or more computing nodes for the group, and initiate execution of those programs on those computing nodes 360. In addition, the module(s) 340 may further interact with computing nodes 360 to later terminate execution of initiated programs on the computing nodes, to migrate one or more of the programs to one or more other computing nodes 360 or computing systems 380, etc. The computing nodes 360 may have various forms in various embodiments, such as to include a number of physical computing systems and/or a number of virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the module(s) 340 may interact with one or more other computing systems 380 to initiate or terminate execution of one or more programs on those computing systems, such as if the computing systems 380 are provided by one or more third-party participants who are providing computing nodes for use by other users. In some embodiments, the module(s) 340 may further or instead manage access to one or more types of computing-related resources or services other than program execution services (e.g., persistent or temporary data storage services, messaging services, database services, etc.).

In addition, the module(s) 340 includes functionality in this example related to monitoring or otherwise interacting with one or more of the computing nodes 360 to track use of those computing nodes, such as to determine current actual program execution capacity or other resource usage capacity of a computing node group and/or to determine current performance characteristics corresponding to some or all computing nodes of a computing node group. As previously noted, such information may be stored on storage 320 and/or elsewhere, and may be used by the module(s) 340 and/or the execution capacity management system in various manners. For example, in some embodiments, if the module(s) 340 discover that a computing node has failed or otherwise become unavailable (e.g., as part of provisioning or otherwise initializing the computing node to be used as part of a computing node group, after the computing node has been in use as part of a computing node group, etc.), the module(s) 340 may automatically take actions to replace the unavailable computing node with a new computing node. In other embodiments, the module(s) 340 may instead not perform some or all of the monitoring of the computing nodes, such as if the module(s) 340 instead obtain information from another source about current actual program execution capacity of a computing node group and/or current performance characteristics corresponding to some or all computing nodes of a computing node group (e.g., as provided by software executing on the computing nodes), and then uses that information to maintain program execution capacity for the computing node group as appropriate.

An embodiment of one or more modules 345 of an execution capacity management system (e.g., a capacity prediction manager module and a capacity governing manager module, such as modules 115 and 125 of FIG. 1A) are also executing in memory 330, and in some embodiments each includes various software instructions that when executed program one or more of the CPU processors 305 to provide the described functionality. The module(s) 345 in this example interact with the program execution service provided by the module(s) 340 via the server computing system 300 (e.g., via shared memory, an internal bus, etc.), although in other embodiments the execution capacity management system and program execution service may instead interact via one or more intervening networks. In this example embodiment, the modules 345 include functionality related to generating predicted execution capacity usage information and performing automatic governing of dynamic modifications of provided execution capacity information based on the predicted information, as discussed in greater detail elsewhere. In addition, in at least some embodiments the modules 345 of the execution capacity management system may simultaneously include multiple capacity prediction manager modules that use different prediction techniques (or a single capacity prediction manager module that similarly supports different prediction techniques). Various information related to the functionality of the modules 345 may be stored in storage 320, such as information 326 related to historical execution capacity usage information for users and/or software programs that is used by the modules 345, and information 328 related to predicted execution capacity usage information for users and/or software programs that is generated and used by the modules 345.

As discussed in greater detail elsewhere, in some embodiments one or more modules of the execution capacity management system may provide functionality to clients distinct from a program execution service, whether instead of or in addition to one or more program execution services. Such clients may, for example, use one or more of the computing systems 350 and/or 380, such as to request a capacity prediction manager module of the execution capacity management system to provide predictions of future capacity usage in light of supplied historical capacity usage and optionally other information. In addition, in some embodiments, particular clients may use predictions of future capacity usage from one or more such capacity prediction manager modules in manners other than to dynamically govern the modifications to a particular computing node group—for example, one or more other modules 347 may optionally execute in memory 330 of computing system 300 (or alternatively on one or more computing systems 350 and/or 380) to obtain predicted future capacity usage information from one or more such capacity prediction manager modules and to automatically perform various activities based on that predicted information, as discussed in greater detail elsewhere.

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system may comprise any combination of hardware or software that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules 340 and/or 345 may in some embodiments be distributed in additional modules. Similarly, in some embodiments some of the functionality of the modules 340 and/or 345 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
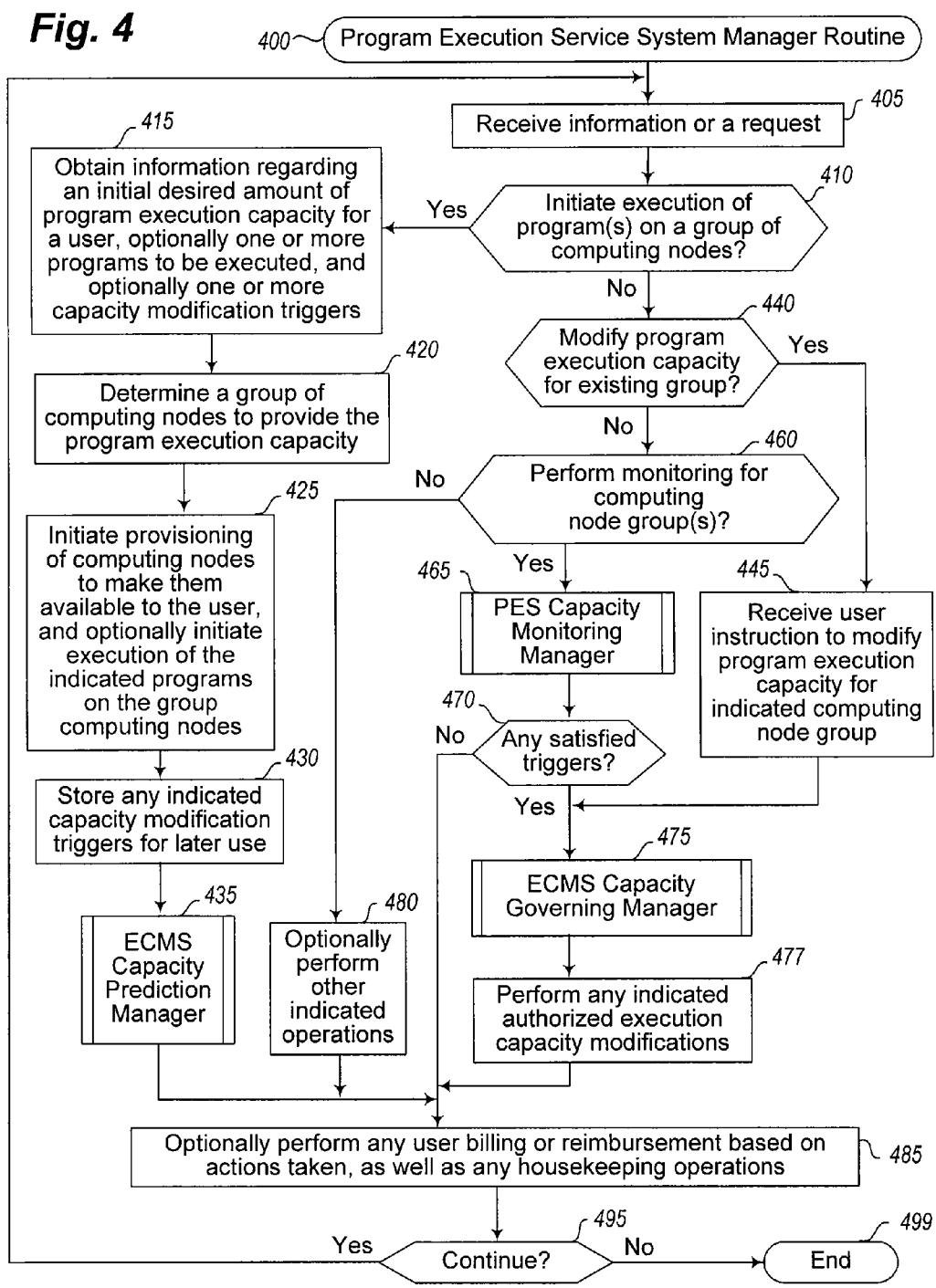
FIG. 4 illustrates a flow diagram of an example embodiment of a PES System Manager routine.

FIG. 4 is a flow diagram of an example embodiment of a Program Execution Service System Manager routine 400. The routine may be provided by, for example, execution of the module 110 of FIG. 1A, a module 180 of FIG. 1B, and/or a module 340 of FIG. 3, such as to assist in managing use of groups of computing nodes for users, as well as to perform other types of management operations in some situations. In this illustrated embodiment, the routine 400 manages various aspects of use of a program execution service that provides program execution capacity for executing programs on behalf of multiple users, and initiates requests to an associated execution capacity management system to provide automatic governing of execution capacity by authorizing some types of dynamic execution capacity modification requests. In the illustrated example embodiment, the associated execution capacity management system is used to authorize dynamic execution capacity modification requests that result from satisfied triggers or from user instructions, but not from automated operations to replace unavailable computing nodes, although the automatic governing may be performed in other manners in other embodiments (e.g., to not automatically govern user instructions, to also automatically govern automated operations to replace unavailable computing nodes, etc.).

In the illustrated embodiment, the routine begins at block 405, where information or a request is received. The routine continues to block 410 to determine if the received request or information is related to initiating execution of one or more programs on a group of computing nodes, such as a request from a user. If so, the routine continues to block 415 to obtain information regarding the requested program execution, such as an initial desired amount of program execution capacity for the computing node group (e.g., a desired computing node quantity), optionally one or more programs to be executed, and optionally one or more user-specified capacity modification triggers. As discussed elsewhere, in some embodiments, a user may select from one or more of various types of computing nodes and/or may otherwise specify various amounts and/or types of computing resources desired (e.g., processing unit type/amount, memory amount, platform specification, etc.). In block 420, the routine then selects the computing nodes to be used for the group, and in block 425 initiates making those selected computing nodes available for the user, such as by provisioning the selected computing nodes and optionally initiating execution of the one or more programs to be executed. When the computing nodes are available for use on behalf of the user, the user may be notified of the availability in various manners, or in other embodiments the computing nodes may begin operation in an automated manner without further interaction by the user. The routine then continues to block 430 to store information related to the computing node group, including any user-specified triggers for the group. After block 430, the routine continues to block 435 to execute a routine to generate predicted execution capacity information for multiple future times for the new computing node group, with one example of such a routine being illustrated with respect to FIG. 6, although in other embodiments such prediction of execution capacity information may be performed at other times (e.g., prior times).

If it is instead determined at block 410 that a request to initiate execution of a group of computing nodes is not received, the routine instead continues to block 440 to determine whether a request is received from a user related to modifying program execution capacity for an existing computing node group of the user. If so, the routine continues to block 445 to receive the dynamically specified user instruction related to modifying program execution capacity for an indicated existing computing node group, and then continues to block 475.

If it is instead determined at block 440 that a request to modify program execution capacity for a group of computing nodes is not received, the routine instead continues to block 460 to determine whether to currently perform periodic or otherwise recurrent activities to monitor information about the program execution capacity for one or more computing nodes groups, although in other embodiments such monitoring may be performed in a continuous or substantially continuous manner. If so, the routine continues to block 465 to execute a routine to perform monitoring of computing node groups being provided, with one example of such a routine being illustrated with respect to FIG. 5 (optionally by a distinct module from the system manager module, such as by a distinct module 180 of FIG. 1B and/or a distinct module 340 of FIG. 3). In this example embodiment, the output of block 465 includes an indication of any dynamic capacity modification requests that result from satisfied triggers at the current time. Accordingly, the routine continues from block 465 to block 470 to determine whether any such triggers were satisfied, and if not continues to block 485. If it is instead determined in block 470 that one or more triggers were satisfied, or after block 445, the routine continues to block 475 to send a request to a capacity governing manager module of the execution capacity management system to perform automatic governing of the dynamic modification requests, with one example of a routine for such an execution capacity management system being illustrated with respect to FIG. 7. In this example embodiment, the output of block 475 includes an indication of any dynamic capacity modification requests that are authorized. Accordingly, the routine continues from block 475 to block 477 to await the response from the capacity governing manager module, and to perform any authorized dynamic execution capacity modifications.

If it is instead determined at block 460 not to currently perform monitoring activities with respect to the program execution capacity for one or more computing nodes groups, the routine instead continues to block 480 to optionally perform one or more other indicated operations. For example, in some embodiments the routine may receive requests from the execution capacity management system for historical execution capacity usage information and/or other information related to program execution capacity being provided by computing node groups for users, and retrieves and supplies such information as information. In addition, in some embodiments the routine may initiate the generation of updated predicted execution capacity information for particular computing node groups at particular times, such as after every time interval for which predicted information was separately generated (e.g., every hour, every day, etc.), after a specified length of time (e.g., after six hours), when new historical information becomes available on which new updated predicted information may be generated, etc. Such operations of block 480 may also include, for example, one or more of the following: responding to user requests related to performing other types of program execution (if the provided program execution service provides such other program execution types), such as to execute a single program on a single computing node; responding to user requests to specify additional triggers or otherwise to modify configuration information for an indicated computing node group; responding to user requests to obtain various status information related to one or more computing node groups with which the user is associated; responding to requests to perform administrative-related activities for a user, such as subscription, registration, or payment operations; etc.

After blocks 435, 477 or 480, or if it is instead determined in block 470 that no triggers were satisfied, the routine continues to block 485 to optionally perform any user billing (or reimbursement) activities based on the information or request received in block 405 or as is otherwise initiated (e.g., periodically), such as to charge and/or collect fees from one or more users based on program execution functionality provided to the users. The routine may further optionally perform periodic housekeeping operations as appropriate.

After block 485, the routine continues to block 495 to determine whether to continue, such as until an explicit indication to terminate execution of the routine is received. If it is determined to continue, the routine returns to block 405, and if not continues to block 499 and ends. It will be appreciated that additional types of activities may be performed in some embodiments and situations, such as to determine whether users are authorized to perform particular requested operations, to immediately obtain payment from users for some types of requested operations, etc. In addition, while user requests and other operations are indicated in the illustrated embodiment as being performed in a manner specific to a particular computing node group and a particular associated user, in other embodiments some or all such operations may instead be applied more generally, such as to multiple computing nodes groups associated with a single user and/or from multiple users associated with one or more computing node groups.

Figure 5:
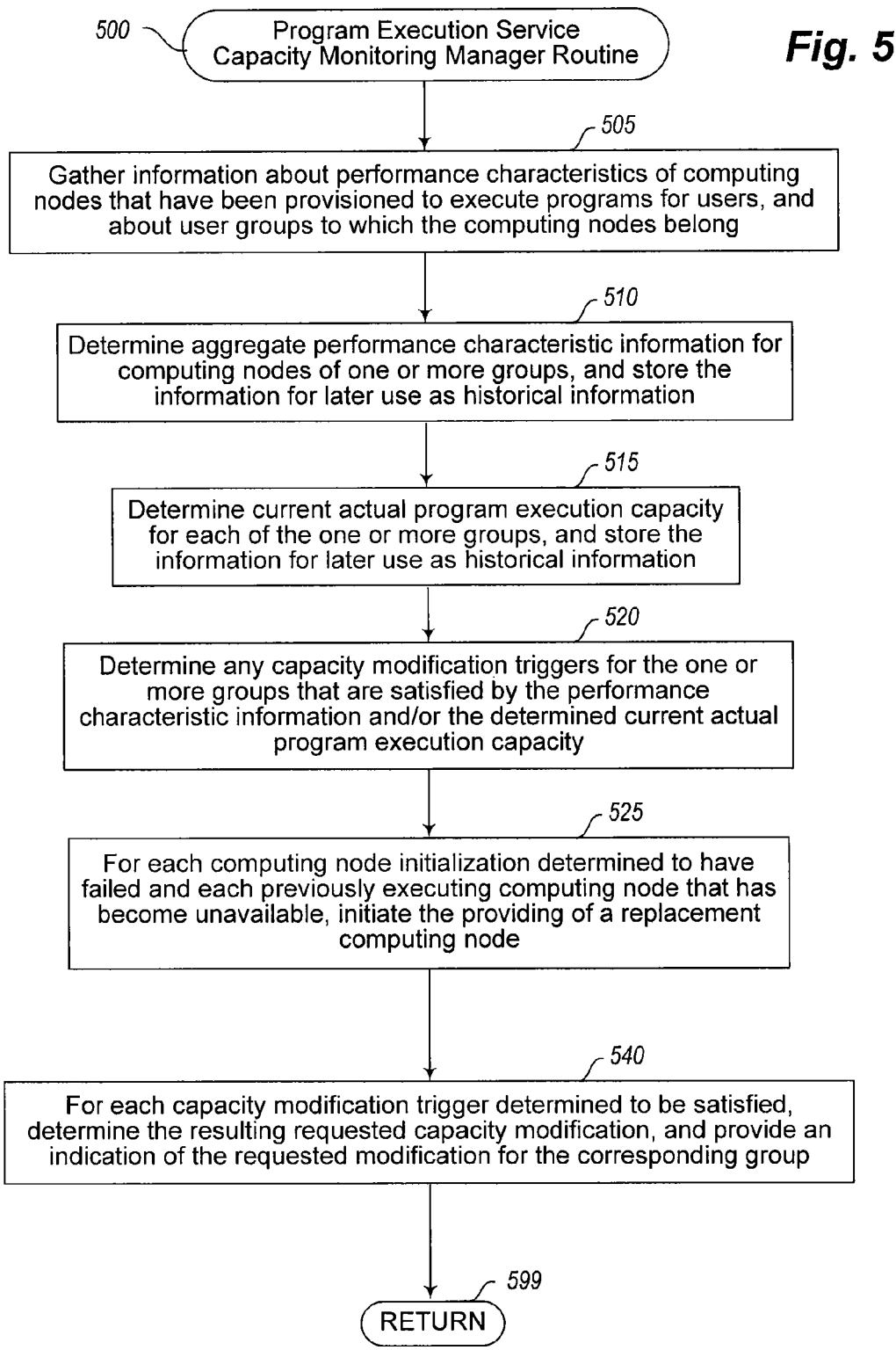
FIG. 5 illustrates a flow diagram of an example embodiment of a PES Capacity Monitoring Manager routine.

FIG. 5 is a flow diagram of an example embodiment of a Program Execution Service Capacity Monitoring Manager routine 500. The routine may be provided by, for example, execution of a portion of the PES system manager module, or instead optionally by a distinct module such as a distinct module 180 of FIG. 1B and/or a distinct module 340 of FIG. 3, such as to assist in monitoring groups of computing nodes for users, including to determine actual program execution capacity that is available from computing node groups. In this illustrated embodiment, the routine 500 is part a program execution service that provides program execution capacity for executing programs on behalf of multiple users, although in other embodiments some or all of the functionality of the routine 500 may be provided in other manners (e.g., by a third-party system to a program execution service).

In the illustrated embodiment, the routine begins at block 505, where an indication is received to initiate gathering of information about computing nodes of one or more computing node groups of interest (e.g., with respect to a particular computing node group of interest, with respect to all computing node groups in use, etc.), such as may be initiated in block 465 of FIG. 4—while not illustrated here, in some embodiments the routine may instead continuously or otherwise in a repetitive or autonomous manner. In block 505, the routine gathers performance characteristics information for one or more such computing nodes, including indications of the computing node groups to which those computing nodes belong, for later use in generating aggregate information for the computing node groups. The information may be gathered in various manners, including by pulling the information by requesting particular computing nodes or associated modules (e.g., associated VM manager components for virtual machine computing nodes) to provide the information, by such computing nodes and/or associated components pushing the information to the routine 500 (e.g., periodically; upon certain types of events, such as a detected error condition that will cause the computing node to shutdown or otherwise become unavailable; etc.), by monitoring network traffic and/or individual resource usage by particular computing nodes; etc.

The routine then continues to block 510 to determine aggregate performance characteristic information for one or more selected computing node groups and to store that determined information for later use, such as for all computing node groups, computing node groups for which individual computing node information was just gathered, computing node groups for which aggregate performance characteristic information has been requested or has not been generated recently, computing node groups for which individual computing node information is available for each of the computing nodes in the computing node group, etc. —in some embodiments, the stored information may later be used as historical information by an embodiment of the capacity prediction manager module of an ECMS to predict future program capacity information. It will be appreciated that aggregate performance characteristic information may be generated in various manners, including when only partial information is available regarding the computing nodes of the group, such as be extrapolating or otherwise estimating individual performance characteristics information that is not available. In addition, particular performance characteristics information that is gathered and/or aggregated may vary in various manners, such as to always collect certain types of information for all computing node groups in certain embodiments, to collect certain types of information based on the criteria specified for determined triggers for particular computing node groups, etc. Furthermore, while blocks 505-540 are illustrated in this example as being performed in a sequential manner, it will be appreciated that various blocks may instead be performed in other manners in some embodiments. For example, in some embodiments, the information gathering activities of block 505 may be performed on a continuous basis or near-continuous basis, but the aggregate information generation of block 510 and/or other blocks may be performed only periodically.

After block 510, the routine continues to block 515 to determine and store current actual program execution capacity information for each of one or more computing node groups, such as to reflect a current quantity of computing nodes of a group that are currently available, and/or one or more other measures of program execution capacity for a computing node group, and stores the determined information for later use—in some embodiments, the stored information may later be used as historical information by an embodiment of the capacity prediction manager module of an ECMS to predict future program capacity information.

In block 520, the routine then determines any capacity modification triggers for any computing node groups that have been satisfied for any computing node groups (e.g., based on performance characteristics information gathered in block 505 and/or aggregated in block 510, and/or based on actual program execution capacity information determined in block 515). If any triggers are determined to be satisfied, information about such satisfied triggers is temporarily stored, and is used to provide output information as part of block 540.

In a similar manner, the routine in block 525 determines whether any computing nodes of any computing node groups have been initiated to be made available for the computing node group, but the initialization has failed or otherwise not completed within a specified period of time (e.g., 10 minutes), or if any existing computing nodes of computing node groups that were previously in use as part of the computing node groups have now been identified as having failed or otherwise become unavailable. If so, the illustrated embodiment of the routine initiates the immediate providing of a replacement computing node for any such computing nodes without using automatic governing functionality of the ECMS, although in other embodiments such replacement activities may be handled in the same manner as dynamic execution capacity modification requests from the satisfaction of triggers. In addition, as part of initiating replacement activities for such unavailable computing nodes, the routine may further take actions to terminate the unavailable computing node (e.g., if it is still running but is unresponsive).

After block 525, the routine continues to block 540, and provides information to the requester that invoked the routine about any triggers determined to be satisfied in block 520. In particular, in the illustrated embodiment the routine provides sufficient information for use by the ECMS to perform its automated governing activities, such as the following for each satisfied trigger: an indication of the computing node group, user and/or specified program(s) to which the trigger corresponds; an indication of the request for dynamic modification, such as a relative computing node quantity change and an indication of the current actual node quantity, an absolute new computing node quantity that would result if the request is satisfied, optionally any performance characteristics related to the trigger; optionally any further specified criteria that are part of the satisfied trigger and for use in determining whether to fulfill the request, etc. Various other information may be provided in other embodiments, and may be provided in other manners in other embodiments (e.g., by storing the corresponding information in a location accessible to the ECMS, by directly sending the information to the ECMS, etc.).

After block 540 the routine continues to block 599 and ends. While the various activities described with respect to routine 500 are illustrated in this embodiment as being performed by a different module than the module that performs routine 400, in other embodiments some or all of the functionality of the two routines may be performed by a single module or otherwise combined.

Figure 6:
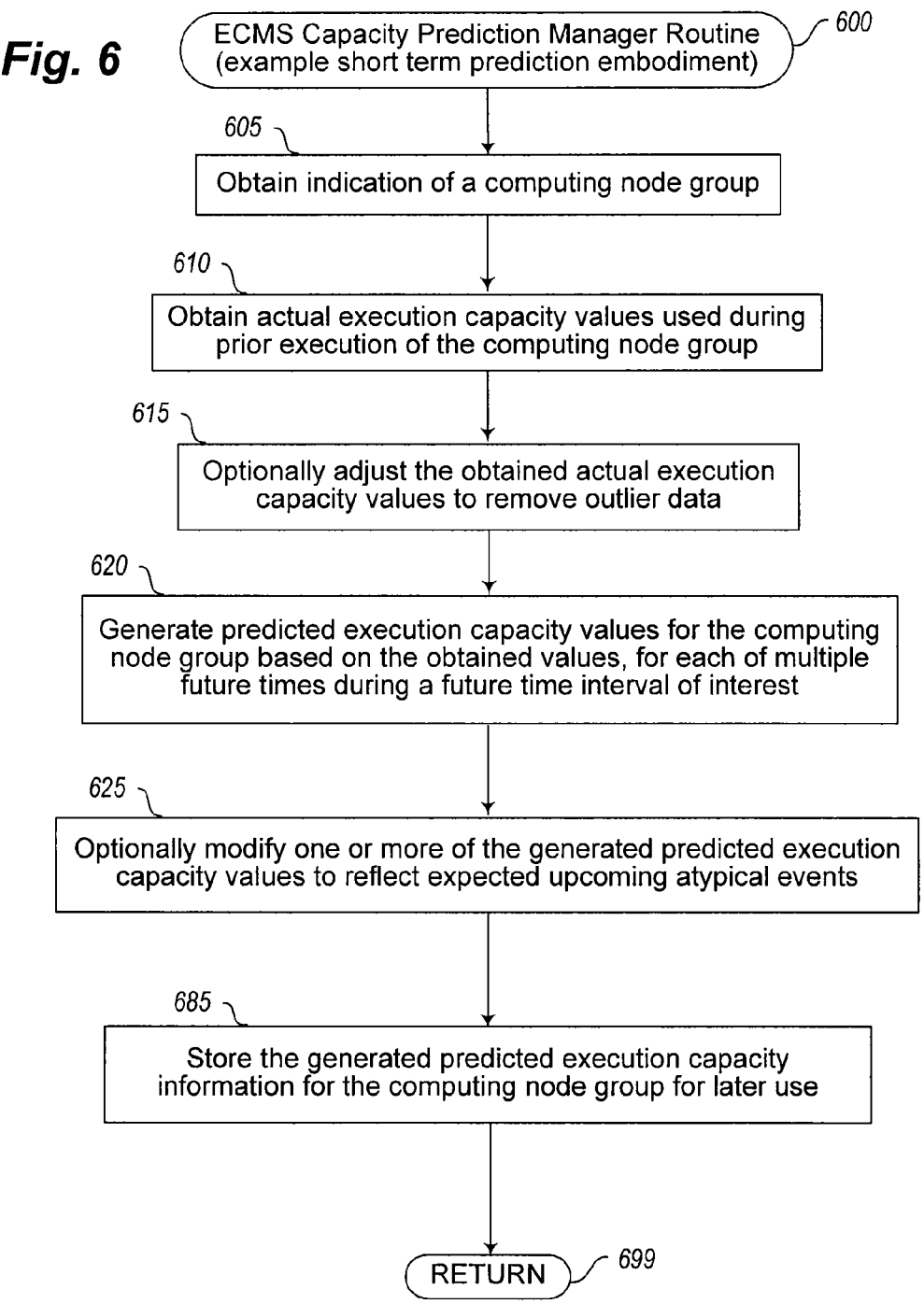
FIG. 6 illustrates a flow diagram of an example embodiment of an ECMS Capacity Prediction Manager routine.

FIG. 6 is a flow diagram of an example embodiment of a Capacity Prediction Manager routine 600 of an execution capacity management system. The routine may be provided by, for example, execution of the capacity prediction manager module 125 of FIG. 1A, by one of the modules 160 of FIG. 1B and/or by one of the modules 345 of FIG. 3, such as to predict execution capacity information for a computing node group for one or more future times. In this example, the illustrated embodiment of the routine generates short-term predictions of future program execution capacity based in part on current and/or recent program execution capacity that has been used, although other embodiments of the routine may instead generate longer-term predictions of future program execution capacity (e.g., as discussed with respect to the embodiment illustrated in FIG. 8), may instead generate predictions of future resource usage that is not specific to program execution capacity, etc. In addition, execution of this illustrated embodiment of the routine may be initiated by a program execution service at block 435 of FIG. 4, although in other embodiments the routine may be initiated in other manners (e.g., may automatically generate predicted information for some or all computing nodes groups in use by one or more program execution services, such as on a continuous or near-continuous basis). Furthermore, while the illustrated embodiment of the routine 600 only discusses generating new prediction information for a computing node group, it will be appreciated that this routine or a similar routine may similarly be used to generate an updated version of previously generated prediction information for a computing node group that is currently in use, such as by newly generating prediction information during computing node group use for one or more future times based on whatever prior capacity usage information is currently available, and/or by retrieving and modifying previously generated prediction information for the computing node group.

In the illustrated embodiment, the routine begins at block 605, where an indication is received of a computing node group for which predicted execution capacity information is to be generated, including information about one or more particular software programs that will be executed by the computing node group at one or more future times of interest. In the illustrated embodiment, the prediction activities are performed based at least in part on information about one or more prior (and/or ongoing) uses of a computing node group to execute the same one or more software programs, and so the routine obtains actual execution capacity usage values and optionally other related information from the prior uses in block 610, such as by receiving the information in block 605, by dynamically interacting with one or more program execution services to request the information, by retrieving the information from one or more accessible storage locations, etc. In at least some embodiments, the obtained information includes time-series data showing actual program execution capacity that is recently used for a series of prior time points or time intervals. The routine next continues to block 615 to optionally remove outlier values from the obtained information, such as based on a statistical analysis (e.g., by deviating from a mean or other midpoint by more than a threshold, such as 1 or more standard deviations).

The routine next continues to block 620 to assess the obtained information, and to use the prior actual capacity usage values to generate corresponding predicted execution capacity usage values for multiple future times. As discussed in greater detail elsewhere, such predicted information may have various forms (e.g., predicted time-series data), and may be generated in various manners (e.g., by performing regression and/or extrapolation using the prior actual capacity usage values). In the illustrated embodiment, the predicted information is generated for each of a determined number of multiple future time points or time intervals (e.g., a fixed number, a number specified in block 605, etc.), but in other embodiments may be generated in other manners (e.g., for a single future time point or time interval). In addition, in the illustrated embodiment, the predicted information generated for each future time point or time interval may include one or more predicted execution capacity amount values, such as a range of multiple values with an upper and lower bound, an enumerated list of multiple predicted values, a single predicted value, etc., and may optionally have a single predicted expected value for some or all such future time points or time intervals (e.g., a midpoint or mean or other average based on multiple predicted values). In some embodiments, a single predicted expected value is first generated, and then additional predicted values (e.g., range that includes the single predicted expected value) are determined based on that single predicted expected value, such as by determining upper and lower bounds that reflect an error calculation or confidence interval for the single predicted expected value. Additional details related to particular ways to generated predicted values are included elsewhere.

After block 620, the routine continues to block 625 to optionally modify one or more of the generated predicted future capacity usage values, such as to reflect expected upcoming atypical events. For example, capacity usage may have been growing at a moderate steady rate recently, such that some or all of the generated predicted future capacity usage values may correspond to such a moderate steady rate—however, if a planned future event is likely to significant increase or decrease the capacity usage, at least some generated predicted future capacity usage values for related future times may be modified to reflect that event. As one illustrative example, if the generated predicted future capacity usage values are for a group of one or more Web servers whose capacity usage values are related to a quantity and/or type of received Web page requests, and a planned future event is likely to significantly increase Web page requests of one or more types at a future time, the generated predicted future capacity usage values for that future time may be adjusted accordingly. After block 625, the routine continues to block 685 in the illustrated embodiment to store the generated predicted execution capacity information for later use, such as to later perform automatic governing of the computing node group for which the predicted information is generated. In other embodiments, the generated predicted information may be used in other manners, whether immediately and/or at a later time, and whether instead of or in addition to performing automatic governing of the computing node group. After block 685, the routine continues to block 699 and returns.

Figure 7:
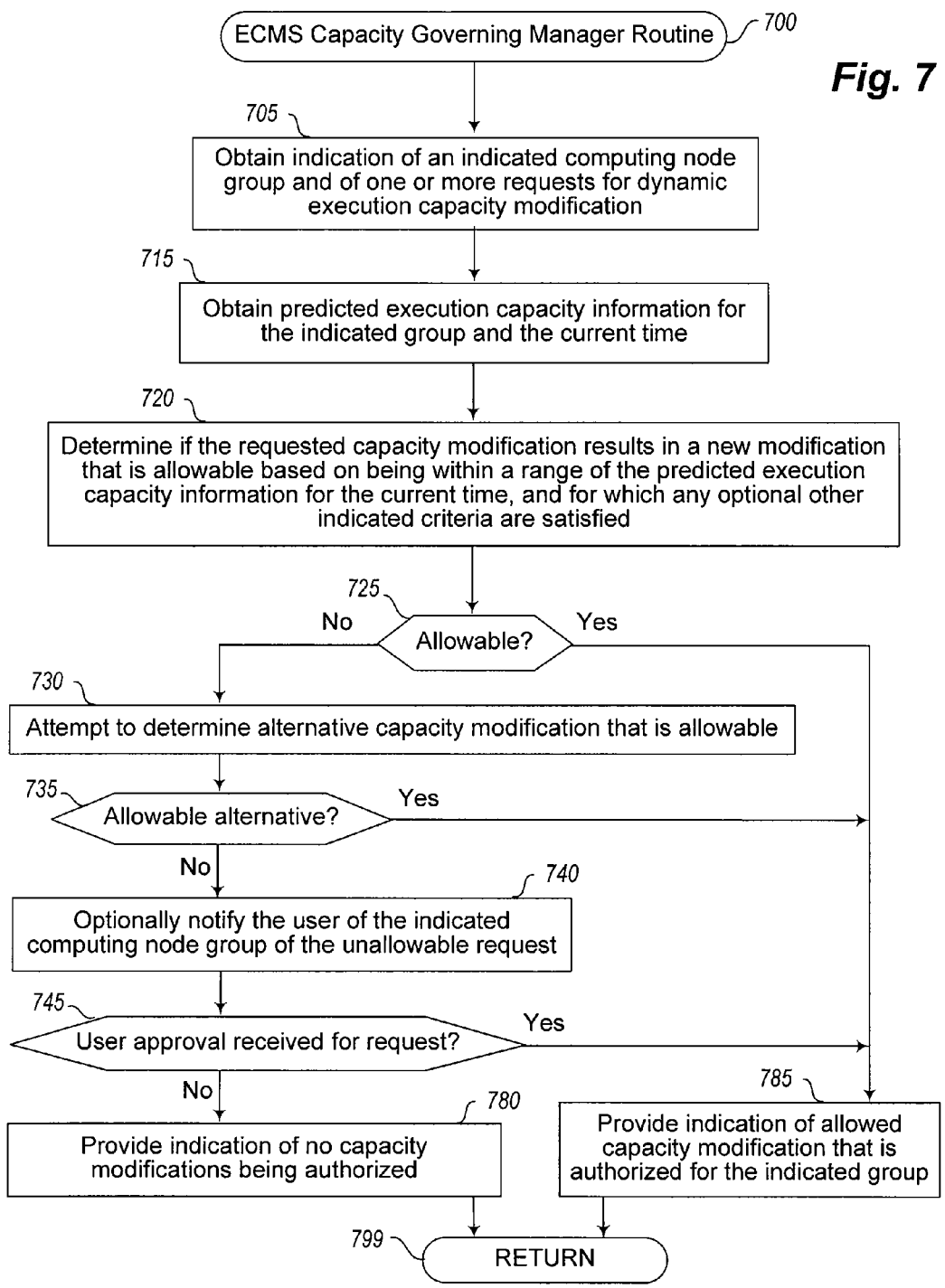
FIG. 7 illustrates a flow diagram of an example embodiment of an ECMS Capacity Governing Manager routine.

FIG. 7 is a flow diagram of an example embodiment of a Capacity Governing Manager routine 700 of an execution capacity management system. The routine may be provided by, for example, execution of the capacity governing manager module 115, by one of the modules 160 of FIG. 1B and/or by one of the modules 345 of FIG. 3, such as to use previously predicted execution capacity information for a computing node group to automatically govern dynamic modification of the program execution capacity for the computing node group. In this illustrated embodiment, the routine 700 is initiated by a program execution service at block 475 of FIG. 4, although in other embodiments the routine may be initiated in other manners.

In the illustrated embodiment, the routine begins at block 705, where an indication is received of a computing node group for which a dynamic execution capacity modification request has been initiated, including information about the modification request (e.g., a relative modification that is requested and information about the current program execution capacity, a new current program execution capacity that would result if the dynamic modification is performed, etc.). In alternative embodiments, rather than receive some or all such information in block 705, the routine may instead obtain such information (e.g., by dynamically interacting with a program execution service to request the information, by retrieving the information from one or more accessible storage locations, etc.). In addition, while only a single dynamic modification request is received and handled in block 705 at a single time in the illustrated embodiment, in other embodiments multiple such dynamic modification requests may be received and handled (e.g., each handled separately in an individual manner; by aggregating the multiple requests in one or more manners, such that a single modification request is considered; etc.). After block 705, the routine continues to block 715 to obtain predicted execution capacity information for the indicated computing node group and at least the current time (or a proximate time, such as if predicted information is not available for the exact current time), such as by receiving the predicted information in block 705, dynamically interacting with the program execution service to request the information, retrieving the previously generated predicted information from one or more accessible storage locations, newly generating such predicted information based on historical data, etc. In at least some embodiments, the predicted information includes time-series data showing a range of predicted program execution capacity for a series of future time points or future time intervals that include the current time.

After block 715, the routine continues to block 720 to determine if the indicated dynamic execution capacity modification request is allowable based at least in part on the obtained predicted information. In particular, the illustrated embodiment of the routine determines in block 720 if a requested execution capacity modification is allowable based on whether the new execution capacity that would result from the modification is within the range of predicted execution capacity values for the current time. In addition, in some embodiments, the routine may further consider whether one or more other criteria are also satisfied in order to find that that a modification request is allowable. If it is determined in block 725 that the modification request was found in block 720 to be allowable, the routine continues to block 785, where an indication is provided by the routine to the requester that the modification request is authorized to be performed.

If it is instead determined in block 725 that the modification request was not found in block 720 to be allowable, the routine continues instead to block 730. In various embodiments, various types of actions may be performed in response to such a non-allowed modification request, including to optionally automatically determine an alternative modification that is allowable, to optionally notify the user for the computing node group of the non-allowed modification request and further optionally prompt the user to provide a manual authorization of the modification request, etc., while in other embodiments some or all such actions may not be performed. In the illustrated embodiment, the routine in block 730 attempts to automatically determine an alternative modification that is allowable, such as a similar type of modification but one that results in an altered new resulting execution capacity amount that is within the range of predicted values for the current time (and/or that is otherwise allowable). If it is then determined in block 735 that such an allowable alternative was found in block 730, the routine continues to block 785 to provide an indication to the requester of the authorized alternative modification. In the illustrated embodiment, if it is determined in block 735 that such an allowable alternative was not found in block 730 (or that such an alternative modification was not attempted to be found), the routine continues to block 740 to optionally notify the user for the computing node group of the non-allowed modification request. Such a notification may further in some embodiments include additional information, such as information about the predicted values for the current time, current performance characteristics information for the computing node group, and/or about any automated attempts to find an allowable alternative modification. In addition, in the illustrated embodiment, the notification may further optionally provide information to the user that prompts the user to provide a manual authorization of the non-allowed modification request if so desired, such as via an API invocation, a manual GUI interaction, etc. After block 740, if it is then determined in block 745 that such a manual authorization was received from the user (e.g., within a specified period of time), the routine continues to block 785 to provide an indication to the requester of the now-authorized original modification request, and otherwise continues to block 780 to provide an indication to the requester that no authorized capacity modifications are to be performed (e.g., after all of multiple received modification requests are determined not to be allowed).

After blocks 780 or 785, the routine continues to block 799 and returns. While the various activities described with respect to routine 700 are illustrated in this embodiment as being performed by a different module than the modules that perform routines 400, 500 and 600 of FIGS. 4, 5 and 6, in other embodiments some or all of the functionality of routine 700 and one or more of the other routines may instead be performed by a single module or may be otherwise combined.

FIG. 8 is a flow diagram of an example embodiment of a Capacity Prediction Manager routine 800 of an execution capacity management system, such as an alternative embodiment that may be provided instead of or in addition to the embodiment previously discussed with respect to FIG. 6. The routine may be provided by, for example, execution of the capacity prediction manager module 125 of FIG. 1A, by one of the modules 160 of FIG. 1B and/or by one of the modules 345 of FIG. 3, such as to predict execution capacity information for a computing node group for one or more future times. In this example, the illustrated embodiment of the routine generates long-term predictions of future program execution capacity based in part on historical program execution capacity that has been used (e.g., over multiple prior years of time), although other embodiments of the routine may instead generate shorter-term predictions of future program execution capacity (e.g., as discussed with respect to the embodiment illustrated in FIG. 6), may instead generate predictions of future resource usage that is not specific to program execution capacity, etc. In addition, execution of this illustrated embodiment of the routine may be initiated in various manners, such as to automatically generate predicted information for one or more or all computing nodes groups in use (e.g., on a continuous or near-continuous basis, upon request, etc.), to be initiated by a program execution service (e.g., with respect to block 435 of FIG. 4), etc. In addition, while the illustrated embodiment of the routine 800 only discusses generating new prediction information for a computing node group, it will be appreciated that this routine or a similar routine may similarly be used to generate an updated version of previously generated prediction information for a computing node group that is currently in use, such as by newly generating prediction information during computing node group use for one or more future times based on whatever prior capacity usage information is currently available, and/or by retrieving and modifying previously generated prediction information for the computing node group. Furthermore, such predicted future capacity usage information may be generated for a variety of types of uses, such as for at least a portion of one or more Web sites (e.g., the Web site of an online retailer), and the performance characteristics for a corresponding group of one or more computing nodes include information about a volume of Web page views for the at least portion of the one or more Web sites.

In the illustrated embodiment, the routine begins at block 805, where an indication is received of a computing node group for which future capacity values will be generated, such as to correspond to program execution capacity for one or more software programs, or more generally to correspond to use of one or more types of hardware resources during one or more uses. The received indication may correspond, for example, to a request from another module or a remote customer for generated predicted future capacity values, or may instead have other forms in other situations (e.g., to periodically generate predicted future capacity values for each of one or more computing node groups). In block 810, the routine then obtains historical actual capacity usage information for the indicated computing node group from prior use of the group, and optionally removes or otherwise limits the weight given to erroneous values in the obtained historical information, such as by identifying outlier values from the obtained information based on a statistical analysis (e.g., by deviating from a mean or other midpoint by more than a threshold, such as 1 or more standard deviations). The historical actual capacity usage information may be obtained in block 810 in various manners in various embodiments, such as by receiving the historical information in block 805, dynamically interacting with one or more program execution services to request the information, retrieving the historical information from one or more accessible storage locations, etc. In at least some embodiments, the historical information includes time-series data showing actual program execution capacity that is used during the prior uses for a series of prior time points or time intervals.

After block 810, the routine continues to block 815 to calculate day-of-week averages for the obtained historical actual capacity values. For example, this operation may include extracting day-of-week data patterns by calculating the averages for each day of a week with all the historical data. The daily value of each day-of-week (i.e., Sunday, Monday, Tuesday, Wednesday, Thursday, Friday and Saturday) is predicted based on the averages from this first step.

After block 815, the routine continues to block 820 to calculate month-of-year average variations for the obtained historical actual capacity values. For example, this second operation computes the monthly changes of the total volume of computing nodes previously used (or alternatively of a different measure of capacity usage, such as a total volume of Web page views). Accordingly, a first multiplicative parameter may be determined in this step to represent the relative average value for each month, which may be subsequently multiplied to a particular day-of-week predicted average from the first step—thus, to generate a predicted execution capacity value for a Monday in September, for example, the day-of-week average information for Mondays may be multiplied by the first multiplicative parameter determined for September, such that the predicted values for Mondays in September will differ from other days-of-week in September and from Mondays in other months.

After block 820, the routine continues to block 825 to calculate year-to-year changes for the obtained historical actual capacity values, optionally based on multiple years of historical data. For example, this third operation computes the year-over-year growth rate (positive or negative) by summing the actual data over each trailing 12 months. Based on the yearly growth rate, the future year-over-year growth rate is estimated for one or more future years at a time of the generating. Accordingly, a second multiplicative parameter may be determined in this step to represent the relative year-over-year growth rate for each future year, and may be subsequently multiplied to the combination of data described above for the second step. Thus, to generate predicted capacity information for a Monday in September for one year in the future in this third step, for example, the day-of-week average information for Mondays is multiplied by the first parameter determined for September and by the second parameter determined for one year in the future, such that the predicted values for Mondays in September at one year in the future will differ from Mondays in September now or at other years in the future.

After block 825, the routine continues to block 830 to identify predictable future events that will affect program execution capacity in atypical manners, such as a holiday season that is not captured in average monthly variations. This fourth step may be performed in different manners in different embodiments. For example, a first manner is to create a holiday shopping pattern based on information extracted for specific historical holiday shopping days, while a second manner is to map the recent years' holiday data patterns to the future. With respect to the first manner, and considering holidays in November and December as an example, the creation of such a holiday shopping pattern may be performed by doing a baseline adjustment for the last eight weeks of one or more prior years, optionally with a final modification to reflect specific holiday spikes on particular days (or days-of-week). With respect to the second manner, the mapping of recent years' holiday data patterns to the future may include, for example, retrieving the past daily aggregates for particular days of interest based on the past two years' historical data, and modifying those values based on the estimation of the year-over-year growth rate from the third step discussed above. As one option, both such manners may be considered for a particular computing node group, and the manner that is more accurate or otherwise useful for that particular computing node group may be selected to be used in the future.

After block 830, the routine continues to block 835 to generate predicted capacity usage amounts for particular future time intervals based on information that is calculated or identified from some or all of the prior activities in steps one through four. This fifth operation includes, if a time interval for which prediction is being generated is not a specialized time period based on an event identified with respect to step four of block 830 (e.g., is not a holiday period or other period of special handling), using predicted data based on the combination of steps one through three in blocks 815-825, as discussed above with respect to step three. Alternatively, if a time interval for which prediction is being generated is a specialized time period based on an event identified with respect to step four of block 830 (e.g., falls into holiday shopping seasons), this fifth operation includes generating the predicted capacity usage data by adjusting the results of the combination of steps one through three to reflect information identified in step four for the event.

After block 835, the routine continues to block 840 to add upper and lower bounds for some or all predicted capacity usage amounts for particular future time intervals, such as to reflect uncertainty for and/or confidence intervals for particular predicted capacity usage amounts. This sixth operation includes, for example, adding uncertainty to the previously discussed predictions in step five of block 835 for particular time intervals so that the resulting generated range of predicted values indicates how likely an actual value is to fall into the predicted range. To compensate for skewedness of the data, the upper and lower bounds may optionally be generated separately, and the deviation of the predicted data from actual data may be tracked and used to determine the width of the prediction range. Thus, the upper and lower bounds may in some embodiments not be symmetric to a predicted single-value, and may further be varied to reflect a particular type of software program being executed and/or because of different monetary and non-monetary costs for over-prediction and under-prediction. This sixth operation may be performed in different manners in different embodiments. For example, a first manner is to use the standard deviation of the absolute prediction errors to calculate an uncertainty range, while a second manner is to use a percentile of the relative prediction errors to calculate the uncertainty range. As one option, both such manners may be considered for a particular computing node group, and the manner that is more accurate or otherwise useful for that particular computing node group may be selected to be used in the future.

After block 840, the routine continues to block 885 in the illustrated embodiment to store the generated predicted capacity information for later use, such as to enable later acquisition and/or provisioning of computing nodes for the computing node group for which the predicted information is generated at particular future times. In addition, if the indication received in block 805 was a request for predicted information, the routine in block 885 may provide response information to the requester that includes some or all of the generated predicted capacity information, or otherwise make that generated predicted capacity information available to the requester, optionally instead of performing the storing of the information. In other embodiments, the generated predicted information may be used in other manners, whether immediately and/or at a later time. After block 885, the routine continues to block 895 to determine whether to continue, such as until an explicit indication to terminate is received. If it is determined to continue, the routine returns to block 805 to wait for another indicated computing node group for which to predict future capacity information, and otherwise continues to block 899 and ends.

The prediction techniques illustrated in the embodiment of FIG. 8 provides various benefits. As one example, these prediction techniques are effective when dealing with unascertained data (e.g., without requiring specific period parameter input to extract information from the historical data and to apply it to describe future events), enabling the incorporation of known and unknown information together to improve prediction accuracies, including the ability to analyze multi-dimensional input (including discrete and even insufficient data). In addition, these prediction techniques are applicable even if sufficient historical data is not available to determine a known statistical distribution in order to make an accurate assessment and prediction of the required parameters. Furthermore, outliers can be identified and removed from the input using different criteria, such as moving average and standard deviation method, but these prediction techniques may also be used even if some or all outlier data remains in the input data set.

As previously noted, predictions of future program execution capacity and other resource usage capacity may be made in various manners in various embodiments. The following provides non-limiting illustrative examples of additional techniques for generating prediction information in some embodiments. These additional techniques may be used for, for example, one or more software programs that provide functionality for at least a portion of one or more Web sites (e.g., the Web site of an online retailer), with the performance characteristics for a corresponding group of one or more computing nodes including information about a volume of Web page views for the at least portion of the one or more Web sites. In addition, if a Web site has different types of Web pages with different access patterns, and historical data is available regarding capacity usage specific to one or more of those types, the prediction techniques may be performed individually for each of those one or more types.

A first example additional prediction technique may be used to forecast the total page views for a specified future day, such as to predict the next month's page view traffic. In order to predict today's page view traffic using the first example additional prediction technique, the following formula is used:

$$\text{MeanTrafficoftheDay} * \frac{\text{AverageTrafficofthePastWeek}}{\text{AverageTrafficofthePast200Weeks}} * \frac{\text{ActualTrafficofYesterday}}{\text{predictedTrafficofYesterday}}$$

and to determine a variation for the predicted page view traffic, the following formula is used:

$$= \text{TrafficStd.Dev.oftheDay} * \left(1 + \frac{|\text{ActualTrafficofYesterday} - \text{predictedTrafficofYesterday}|}{\text{predictedTrafficofYesterday}}\right)$$

such that the prediction accuracy of yesterday's traffic directly affects the current day's traffic prediction and its variation. Predictions for particular days may further be adjusted to reflect identified events that affect page view traffic, in a manner similar to that previously discussed. The first example additional prediction technique benefits from removing outliers from historical data before the historical data is used in the formulas above.

A second example additional prediction technique may be used to forecast the total page views for a specified future day, such as to predict the next month's page view traffic. This prediction technique breaks down historical daily traffic time-series data into components to analyze and predict its behavior, and may be used to fit a wide range of data with complex patterns (e.g., trends, seasonal factors, cyclical behavior that might include multiple predictors, etc.). In addition, the model fitting estimations may be smoothed, such as by using Holt-Winters exponential smoothing if the data exhibits both trend and seasonality in order to separate the pattern from the random error. Exponential smoothing allows continually revising a prediction in the light of more recent experience, by assigning exponentially decreasing weights as a historical data point get older, so as to give more weight to recent data. In order to predict page view traffic using the second example additional prediction technique, the following basic model is used, assuming the data has a trend and seasonal components (which can be modeled in various ways):

$$y_t = \mu_t + \gamma_t + \epsilon_t$$

where $\mu_t$ is the trend, $\gamma_t$ is the seasonal, and the $\epsilon_t$ is the irregular term. Predictions for particular days may further be adjusted to reflect identified events that affect page view traffic, in a manner similar to that previously discussed. The second example additional prediction technique may optionally be used without removing outliers from historical data before the historical data is used.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
providing, by one or more configured computing systems of a program execution service, execution capacity for use in executing a software program, wherein the providing of the program execution capacity includes using multiple computing nodes that provide an initial amount of execution capacity at a first time;
obtaining, by the one or more configured computing systems, a prediction of future execution capacity to be used during later execution of the software program after the first time, wherein the prediction includes one or more predicted execution capacity amounts; and
using, by the one or more configured computing systems, the obtained prediction to govern the execution capacity that is provided during the executing of the software program by:
determining that a requested modified amount of execution capacity is approved for the executing of the software program based on the requested modified amount matching the one or more predicted execution capacity amounts, wherein the modified amount is requested during the executing of the software program at a time after the prediction of the future execution capacity; and
providing the requested modified amount of execution capacity by modifying the multiple computing nodes used for the providing of the execution capacity so that the modified multiple computing nodes provide the requested modified amount of execution capacity.

2. The method of claim 1 wherein the modifying of the multiple computing nodes includes increasing or decreasing a quantity of the multiple computing nodes used for the providing of the execution capacity.

3. The method of claim 1 wherein the modifying of the multiple computing nodes includes replacing at least one of the multiple computing nodes with a different computing node that has a different amount of one or more types of computing resources.

4. The method of claim 1 wherein the modifying of the multiple computing nodes includes modifying an amount of one or more computing resources that are available to at least one of the multiple computing nodes.

5. The method of claim 1 wherein the one or more predicted execution capacity amounts are for an indicated future time after the first time, and wherein the determining that the requested modified amount is approved is performed at the indicated future time.

6. The method of claim 1 wherein the program execution service has a plurality of computing nodes configurable to execute programs of users of the program execution service, wherein the multiple computing nodes are a subset of the plurality of computing nodes, and wherein the providing of the execution capacity is performed in response to a request received from a first user of the program execution service.

7. The method of claim 6 further comprising identifying the requested modified amount of execution capacity based on an automated determination by the one or more configured computing systems that a capacity modification trigger is satisfied during the executing of the software program at a second time after the first time, the capacity modification trigger being specified by the first user as part of configuration information supplied by the first user with the received request from the first user.

8. The method of claim 6 further comprising identifying the requested modified amount of execution capacity based on instructions that are specified by the first user during the executing of the software program at a second time after the first time.

9. The method of claim 1 wherein the obtaining of the prediction of the future execution capacity includes generating the one or more predicted execution capacity amounts, the one or more predicted execution capacity amounts including a lower bound execution capacity amount for each of one or more future times after the first time.

10. The method of claim 1 wherein the obtaining of the prediction of the future execution capacity includes generating the one or more predicted execution capacity amounts, the one or more predicted execution capacity amounts including an upper bound execution capacity amount for each of one or more future times after the first time.

11. The method of claim 1 wherein the obtaining of the prediction of the future execution capacity includes generating, before the first time, the one or more predicted execution capacity amounts to include, for each of one or more future times after the first time, multiple authorized predicted execution capacity amounts for the future time.

12. The method of claim 1 further comprising determining that a second requested modified amount of execution capacity is not approved, and wherein the using of the obtained prediction to govern the execution capacity further includes providing an altered amount of execution capacity for the executing of the software program in response to the second requested modified amount of execution capacity, the altered amount of execution capacity being distinct from the second requested modified amount and corresponding to the one or more predicted execution capacity amounts.

13. The method of claim 1 wherein the providing of the execution capacity is performed for a user of the program execution service, wherein the method further comprises determining that a second requested modified amount of execution capacity is not approved, the second requested modified amount of the provided execution capacity being based on a capacity modification trigger that was previously specified by the user and that is determined during the executing of the software program to be satisfied, and wherein the using of the obtained prediction to govern the execution capacity further includes notifying the user that the second requested modified amount is not approved.

14. The method of claim 1 wherein the obtaining of the prediction of the future execution capacity includes obtaining historical data indicating prior program execution capacity that was used during multiple prior executions of the software program, and generating the prediction of the future execution capacity based at least in part on the obtained historical data.

15. The method of claim 1 wherein the one or more predicted execution capacity amounts include a first predicted execution capacity amount for a first future time, wherein the first predicted execution capacity amount is larger than the initial amount of execution capacity, and wherein the method further comprises, before the first future time and during the executing of the software program:
    initiating, based on the first predicted execution capacity amount and before receiving a request to increase the initial amount of execution capacity, provisioning of one or more computing nodes to be available for use in the executing of the software program at the first future time.

16. The method of claim 1 wherein the providing of the execution capacity is performed for a user of the program execution service in response to a request from the user that specifies a capacity modification trigger for later use in automatically modifying the provided execution capacity for the executing of the software program, wherein the specified capacity modification trigger has one or more criteria for use in determining if the capacity modification trigger is satisfied, and wherein the method further comprises monitoring the multiple computing nodes to determine values for one or more types of performance characteristics related to the executing of the software program, to enable determination of whether the one or more criteria become satisfied during the executing of the software program.

17. A non-transitory computer-readable medium having stored contents that configure a computing system to perform a method, the method comprising:
    generating, by the configured computing system, a prediction of future execution capacity to be used during later execution of a software program, wherein the prediction includes one or more predicted execution capacity amounts;
    initiating, by the configured computing system, executing the software program using provided execution capacity from a group of one or more computing nodes, wherein the provided execution capacity includes an initial amount of execution capacity at a first time; and
    using, by the configured computing system, the generated prediction to govern the provided execution capacity after the first time by:
        determining, during the executing of the software program, that a requested modified amount of execution capacity is approved for the executing of the software program based on the requested modified amount matching the one or more predicted execution capacity amounts; and
        initiating providing, in response to the determining that the requested modified amount is approved, the requested modified amount of execution capacity from the group of computing nodes based on one or more modifications to the group.

18. The non-transitory computer-readable medium of claim 17 wherein the initiating providing of the requested modified amount of execution capacity includes modifying multiple computing nodes of the group, and wherein the stored contents include executable software instructions.

19. The non-transitory computer-readable medium of claim 17 wherein the method further comprises:
    receiving, by the configured computing system after the generating of the prediction, information from a second computing system about the requested modified amount of execution capacity, and wherein the initiating providing the requested modified amount of execution capacity includes providing information to the second computing system to indicate that the requested modified amount is approved.

20. The non-transitory computer-readable medium of claim 19 wherein the second computing system is part of a program execution service that is providing the execution capacity for the executing of the software program in response to a request from a user of the program execution service, and wherein the configured computing system is part of an execution capacity management system.

21. The non-transitory computer-readable medium of claim 17 wherein the generating of the prediction of the future execution capacity is performed at a first time and includes generating, for each of one or more future times after the first time, multiple authorized predicted execution capacity amounts for the future time, and wherein the determining that the requested modified amount of execution capacity is approved is performed for one of the future times.

22. The non-transitory computer-readable medium of claim 17 wherein the method further comprises:
executing the software program using the provided execution capacity;
determining that one or more criteria become satisfied during the executing of the software program, the one or more criteria being associated with a specified capacity modification trigger for use in automatically modifying the provided execution capacity; and
identifying the requested modified amount of execution capacity based on the specified capacity modification trigger.

23. A system comprising:
one or more processors of one or more computing systems; and
one or more modules that are configured to, when executed by at least one of the one or more processors, manage execution capacity by:
initiating execution of a software program using execution capacity provided from a group of one or more computing nodes, the provided execution capacity including an initial amount of execution capacity at a first time;
obtaining a prediction of future execution capacity to be used during later execution of the software program, wherein the prediction includes one or more predicted execution capacity amounts; and
using the obtained prediction to govern the execution capacity that is provided during the executing of the software program by:
determining, during the executing of the software program and after the first time, that a requested modified amount of execution capacity is approved for the executing of the software program based on the requested modified amount matching the one or more predicted execution capacity amounts; and
providing, based on the determining that the requested modified amount is approved, the requested modified amount of execution capacity from the group of computing nodes based on one or more modifications to the group.

24. The system of claim 23 wherein the providing of the requested modified amount of execution capacity includes modifying multiple computing nodes of the group, and wherein the one or more modules includes software instructions for execution by the at least one processor.

* * * * *